(12) United States Patent
Emura

(10) Patent No.: US 11,685,390 B2
(45) Date of Patent: Jun. 27, 2023

(54) ASSISTANCE METHOD AND ASSISTANCE SYSTEM AND ASSISTANCE DEVICE USING ASSISTANCE METHOD THAT EXECUTE PROCESSING RELATING TO A BEHAVIOR MODEL

(71) Applicant: Panasonic Intellectual Property Management Co., Ltd., Osaka (JP)

(72) Inventor: Koichi Emura, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 192 days.

(21) Appl. No.: 16/803,433

(22) Filed: Feb. 27, 2020

(65) Prior Publication Data

US 2020/0198649 A1 Jun. 25, 2020

Related U.S. Application Data

(63) Continuation of application No. PCT/JP2018/029640, filed on Aug. 7, 2018.

(30) Foreign Application Priority Data

Aug. 31, 2017 (JP) .............................. JP2017-167751

(51) Int. Cl.
*B60W 50/00* (2006.01)
*G05B 13/02* (2006.01)

(52) U.S. Cl.
CPC ......... *B60W 50/00* (2013.01); *G05B 13/0265* (2013.01); *B60W 2050/0028* (2013.01); *B60W 2554/4029* (2020.02)

(58) Field of Classification Search
CPC .............. G05B 13/0265; G05B 13/027; G05B 13/0285; G05B 13/04; G06K 9/00845;
(Continued)

(56) References Cited

U.S. PATENT DOCUMENTS 9,147,353 B1 * 9/2015 Slusar ................... G06Q 40/08
9,914,458 B2    3/2018 Sato et al.
(Continued)

FOREIGN PATENT DOCUMENTS

CN    103390406 A    11/2013
CN    106338988 A     1/2017
(Continued)

OTHER PUBLICATIONS

Chinese Office Action, dated Sep. 2, 2021, for Chinese Application No. 201880070605.4, 29 pages. (with English Translation).
(Continued)

*Primary Examiner* — Christian Chace
*Assistant Examiner* — Shayne M. Gilbertson
(74) *Attorney, Agent, or Firm* — Seed IP Law Group LLP

(57) ABSTRACT

A driving assistance device executes processing relating to a behavior model of a vehicle. Detected information from the vehicle is input to a detected information inputter. An acquirer derives at least one of a travel difficulty level of a vehicle, a wakefulness level of a driver, and a driving proficiency level of the driver on the basis of the detected information that is input to the detected information inputter. A determiner determines whether or not to execute processing on the basis of at least one information item derived by the acquirer. If the determiner has made a determination to execute the processing, a processor executes the processing relating to the behavior model. It is assumed that the processor does not execute the processing relating to the behavior model if the determiner has made a determination to not execute the processing.

31 Claims, 21 Drawing Sheets

DRIVING LEARNING IN PROGRESS ...

LEARNING AMOUNT

TRAVEL DIFFICULTY LEVEL

WAKEFULNESS LEVEL

DRIVING PROFICIENCY LEVEL

(58) Field of Classification Search
CPC .............. G06K 9/00832; B60W 50/00; B60W 2050/0029
See application file for complete search history.

(56) References Cited

U.S. PATENT DOCUMENTS

| | | | |
|---|---|---|---|
| 2010/0033333 A1* | 2/2010 | Victor | A61B 5/7264 340/576 |
| 2016/0046298 A1* | 2/2016 | DeRuyck | G06V 20/597 340/576 |
| 2016/0104486 A1* | 4/2016 | Penilla | G10L 15/02 704/232 |
| 2017/0008522 A1 | 1/2017 | Sato et al. | |
| 2018/0009466 A1* | 1/2018 | Akatsuka | B60W 30/00 |
| 2018/0170392 A1* | 6/2018 | Yang | G01C 21/3679 |

FOREIGN PATENT DOCUMENTS

| | | |
|---|---|---|
| JP | 2006347531 A | 12/2006 |
| JP | 2008058696 A | 3/2008 |
| JP | 2010-72800 A | 4/2010 |
| JP | 2010072800 A | 4/2010 |
| JP | 2011053798 A | 3/2011 |
| JP | 2017013749 A | 1/2017 |
| JP | 2017107299 A | 6/2017 |

OTHER PUBLICATIONS

International Search Report, dated Oct. 9, 2018, for International Application No. PCT/JP2018/029640, 4 pages.

\* cited by examiner

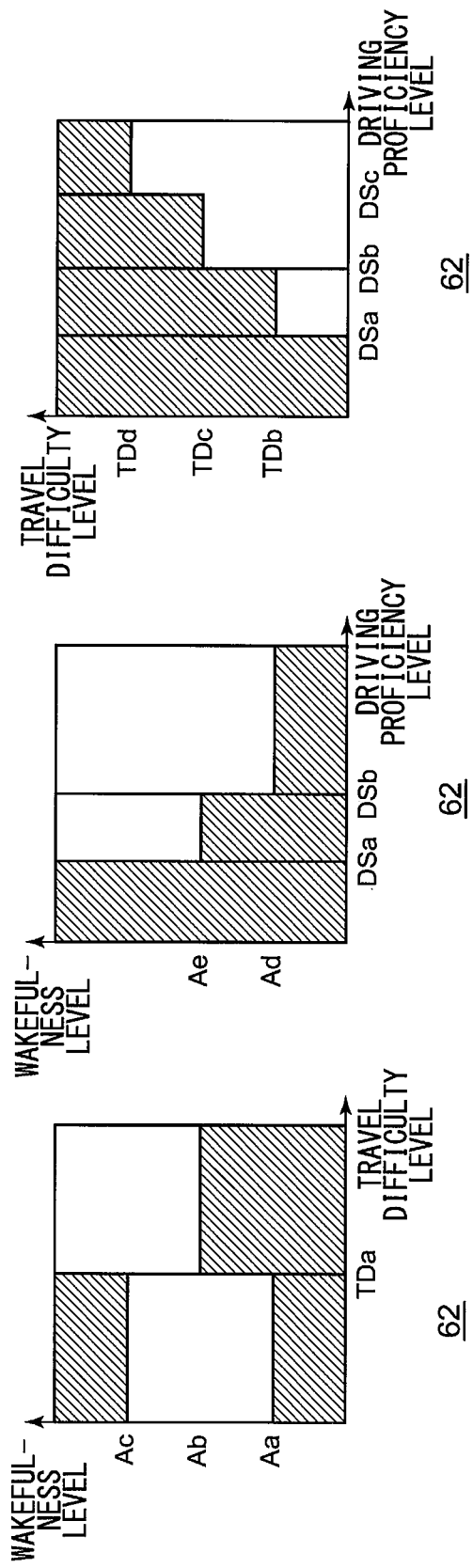

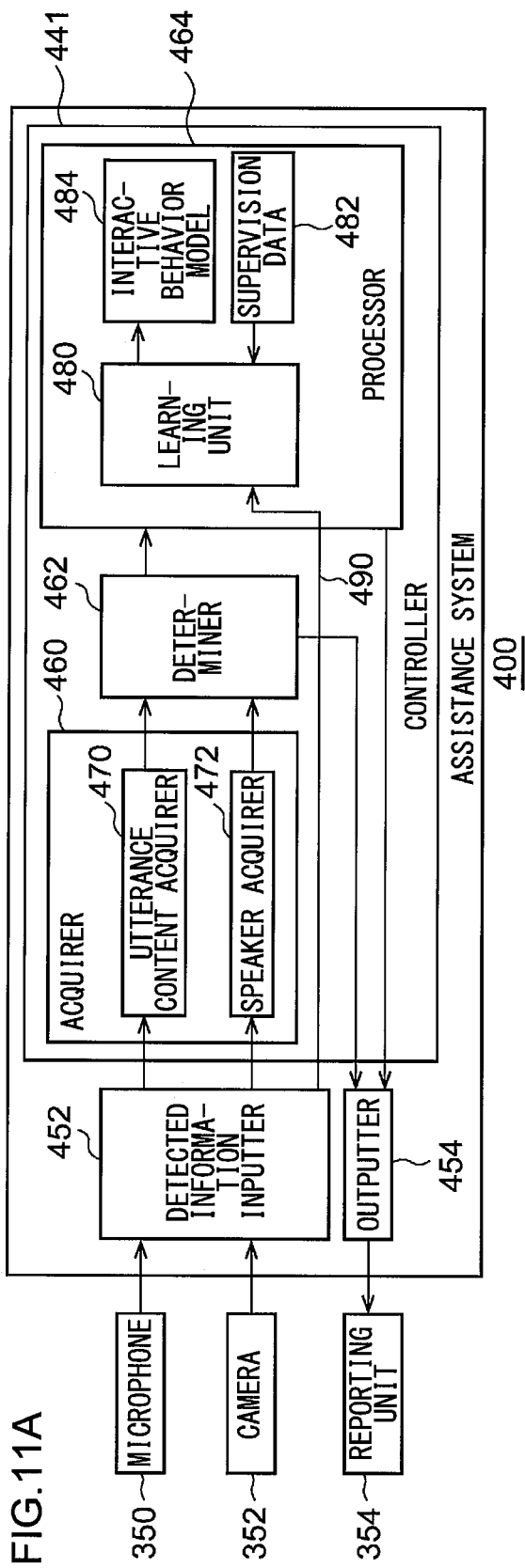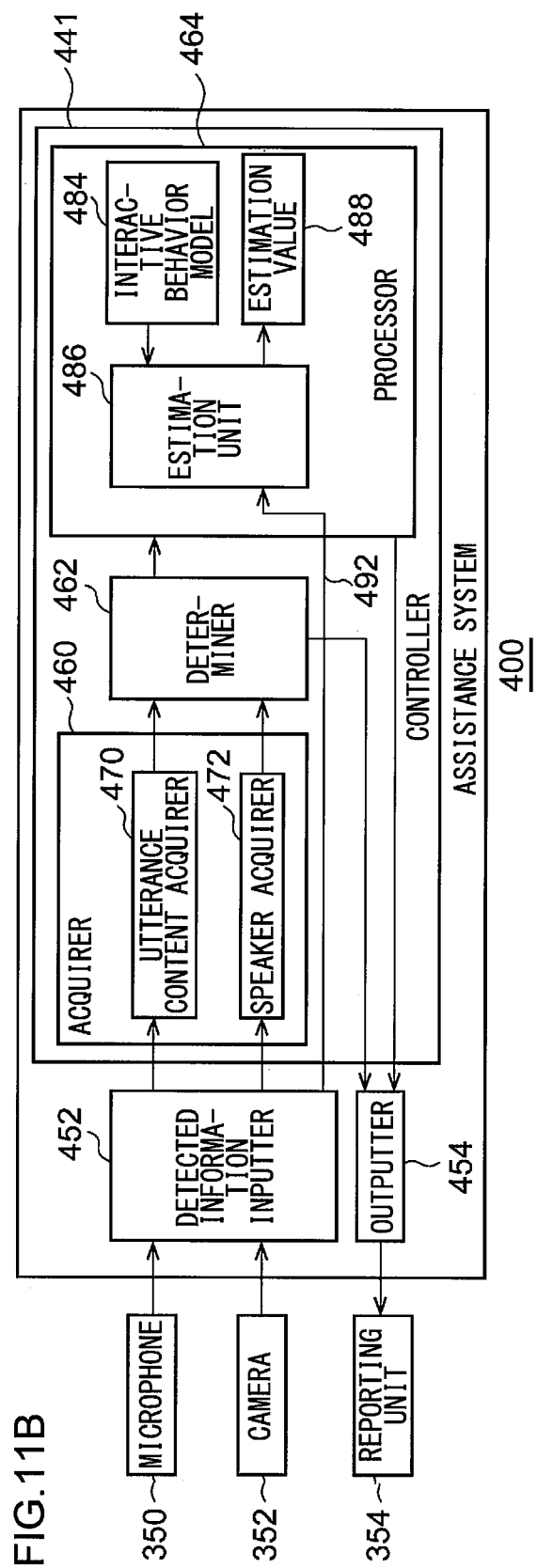

ASSISTANCE METHOD AND ASSISTANCE SYSTEM AND ASSISTANCE DEVICE USING ASSISTANCE METHOD THAT EXECUTE PROCESSING RELATING TO A BEHAVIOR MODEL

BACKGROUND

1. Field

The present disclosure relates to an assistance method that executes processing relating to a behavior model and an assistance system and an assistance device that use the assistance method.

2. Description of the Related Art

In the conventional practice, systems that estimate a driving environment of a vehicle and a driving situation of a driver and execute driving assistance according to the driving environment and driving situation have been studied. The goal of such systems is to more accurately perform driving assistance according to the driver. For example, detected data representing vehicle behavior and driver operations is detected, and the driving environment of the vehicle is determined on the basis of the detected data. Furthermore, an estimation model that is prepared for each type of driving environment is stored, and estimation model learning is executed on the basis of the detected data. In addition, the estimation model corresponding to the determined driving environment is used, and the driving situation of the driver is estimated on the basis of the detected data (see, for example, Patent document 1).

[patent document 1] Japanese Unexamined Patent Publication No. 2011-53798.

By using an estimation model prepared for each type of driving environment, a driving situation for which the effect of the driving environment is diminished may be estimated. Meanwhile, if the driver is in a low wakefulness level state due to drowsiness, for example, it may be said that the state is not a state suitable for driving. Even when learning or estimation is performed in such a state, the accuracy of the learning or estimation is then low.

SUMMARY

The present disclosure was conceived in view of such a situation, and the purpose of the present disclosure is to provide a technique for suppressing the execution of learning or estimation in states which are unsuitable for learning or estimation.

In order to solve the foregoing problem, an assistance system of one embodiment of the present disclosure is an assistance system that executes processing relating to a behavior model, including: a detected information inputter to which detected information is input; an acquirer structured to acquire one or more information items affecting the accuracy of the behavior model, on the basis of the detected information input to the detected information inputter; a determiner structured to determine, on the basis of the one or more information items acquired by the acquirer, whether or not to execute processing; and a processor structured to execute the processing relating to the behavior model if the determiner has made a determination to execute processing. It is assumed that the processor does not execute the processing relating to the behavior model if the determiner has made a determination to not execute processing.

Another embodiment of the present disclosure is an assistance device. This device is an assistance device that executes processing relating to a behavior model, including: a detected information inputter to which detected information is input; an acquirer structured to acquire one or more information items affecting the accuracy of the behavior model, on the basis of the detected information input to the detected information inputter; a determiner structured to determine, on the basis of the one or more information items acquired by the acquirer, whether or not to execute processing; and a processor structured to execute the processing relating to the behavior model if the determiner has made a determination to execute processing. It is assumed that the processor does not execute the processing relating to the behavior model if the determiner has made a determination to not execute processing.

Yet another embodiment of the present disclosure is an assistance method. This method is an assistance method that executes processing relating to a behavior model, including the steps of: inputting detected information; acquiring, on the basis of the detected information thus input, one or more information items affecting the accuracy of the behavior model; determining, on the basis of the one or more acquired information items, whether or not to execute processing; executing the processing relating to the behavior model if a determination to execute processing has been made; and not executing the processing relating to the behavior model if a determination to not execute processing has been made.

Note that configurations in which optional combinations of the foregoing constituent elements or a portion of the constituent elements, such as the processor, for example, are processed sequentially or collectively at predetermined intervals of one day or the like by a computer via a communication network, or configurations obtained by transforming representations of the present disclosure between devices, systems, methods, programs, or recording media whereon the program is recorded, and between vehicles and the like in which the devices are installed, are also effective as embodiments of the present disclosure.

BRIEF DESCRIPTION OF THE DRAWINGS

The figures depict one or more implementations in accordance with the present teaching, by way of example only, not by way of limitations. In the figures, like reference numerals refer to the same or similar elements.

FIGS. 4A, 4B and 4C illustrate configurations of tables stored in the determiner of FIGS. 3A and 3B.

FIGS. 11A and 11B are diagrams illustrating configurations of an assistance system according to the second embodiment.

DETAILED DESCRIPTION

Figure 1:
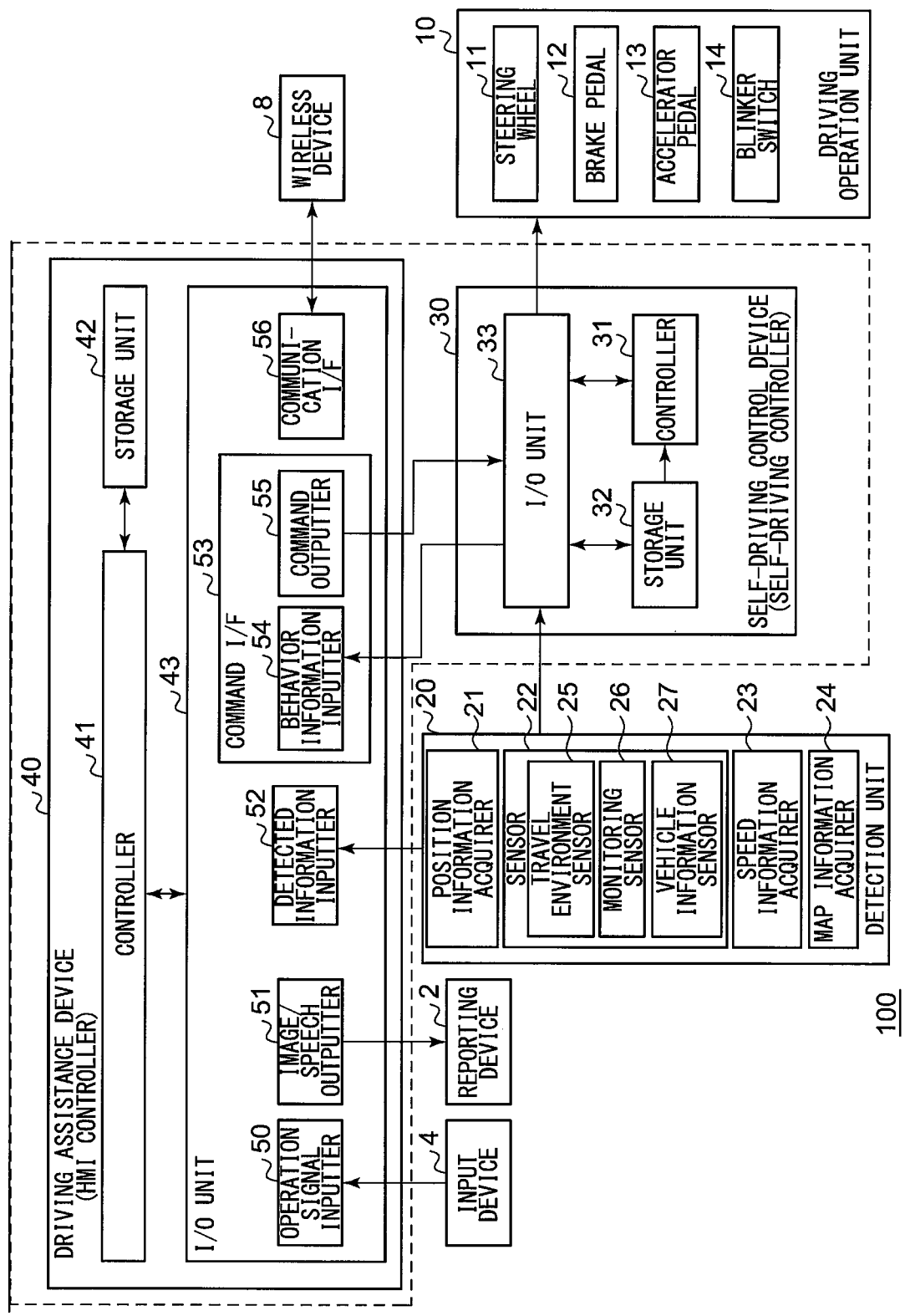
FIG. 1 is a diagram illustrating a configuration of a vehicle according to a first embodiment.

The invention will now be described by reference to the preferred embodiments. This does not intend to limit the scope of the present invention, but to exemplify the invention.

Before the present disclosure is described in specific terms, an overview will be provided. This embodiment relates to self-driving of automobiles. More particularly, the present embodiment relates to a device for controlling a human machine interface (HMI) (hereinafter called a "driving assistance device") for exchanging information relating to vehicle driving behavior with an occupant of a vehicle (a driver, for example). Furthermore, the driving assistance device executes learning of a driving behavior model (hereinafter called "learning processing") for self-driving and/or estimation of driving behavior (hereinafter called "estimation processing") on the basis of a driving behavior model. The processing of the present disclosure may be learning and/or estimation of driving behavior and may be a non-driving behavior or non-driving operation during driving, such as the operation of an in-vehicle infotainment (IVI) device, for example. The non-execution of the present disclosure is cancellation or interruption of processing, and in the case of interruption, processing may be continued. Furthermore, if the non-execution of the present disclosure has not been determined, cancellation or interruption may be implemented forcibly via an input from the driver when processing is being executed.

Various terms in the present embodiment are defined as follows. "Driving behavior" includes operating states such as steering and braking while the vehicle is traveling or when the vehicle stops, or control content pertaining to self-driving control, such as, for example, traveling at a fixed speed, accelerating, decelerating, stopping temporarily, stopping, changing lanes, changing course, turning left and right, and parking. Furthermore, driving behavior may be cruising (maintaining a vehicle speed while maintaining a vehicle lane), maintaining a vehicle lane, following a preceding vehicle, stop-and-go driving while following, overtaking, dealing with a merging vehicle, transferring (interchange) including entry to or departure from a highway, merging, dealing with a work zone, dealing with an emergency vehicle, dealing with an intruding vehicle, dealing with a right/left dedicated lane, interacting with a pedestrian or bicycle, avoiding an obstacle other than a vehicle, dealing with a beacon, dealing with right/left turn and U-turn restrictions, dealing with a vehicle lane restriction, dealing with one-way traffic, dealing with a traffic-control sign, and dealing with an intersection or roundabout, and the like.

Any of deep learning (DL), machine learning (ML), a filter, or the like, or a combination thereof is used as a "driving behavior estimation engine". Deep learning is a convolutional neural network (CNN) or a recurrent neural network (RNN), for example. Furthermore, machine learning is a support vector machine (SVM), for example. In addition, a filter is collaborative filtering, for example.

A "driving behavior model" is uniquely determined according to the driving behavior estimation engine. A driving behavior model in the case of DL is a learned neural network, a driving behavior model in the case of SVM is a learned prediction model, and a driving behavior model in the case of collaborative filtering is data obtained by associating travel environment data with driving behavior data. A driving behavior model in the case of rules is data obtained by associating inputs with outputs.

On the basis of such a definition, the driving assistance device executes learning processing by using supervision data and detection results relating to driver operations such as a steering angle, a brake pedal depression amount, and an accelerator pedal depression amount, and executes estimation processing by using the detection results and a driving behavior model. As mentioned earlier, when learning or estimation is carried out in cases where the state is not a state suitable for driving, the accuracy of the learning or estimation is then low. Hence, in such cases, it is preferable to not perform learning or estimation.

In order to deal with this issue, according to the present embodiment, at least one of a travel difficulty level, a wakefulness level, and a driving proficiency level is derived, and a determination is made regarding whether or not to execute learning or estimation processing on the basis of at least one of the travel difficulty level, the wakefulness level, and the driving proficiency level. Learning or estimation is executed if a determination to execute processing has been made and learning or estimation is not executed if a determination to not execute processing has been made. Embodiments of the present disclosure will be described in detail hereinbelow with reference to the drawings. The respective embodiments described hereinbelow are an example, and the present disclosure is not limited to or by such embodiments.

FIG. 1 illustrates a configuration of a vehicle 100 and more particularly illustrates a configuration that relates to a self-driving vehicle. The vehicle 100 is capable of traveling in a self-driving mode and includes a reporting device 2, an input device 4, a wireless device 8, a driving operation unit 10, a detection unit 20, a self-driving control device 30, and a driving assistance device 40. The devices illustrated in FIG. 1 may be interconnected by means of wired communication such as a dedicated line or a controller area network (CAN). Furthermore, the devices may be interconnected by means of wired communication or wireless communication such as universal serial bus (USB), ethernet (registered trademark), Wi-Fi (registered trademark), or Bluetooth (registered trademark).

The reporting device 2 reports information relating to travel of the vehicle 100 to its occupant. The reporting device 2 is, for example, a car navigation system installed in a vehicle, a head-up display, or a center display. The reporting device 2 may be a display unit that displays any kind of information, such as a light emitting diode (LED) or other light-emitting body which is installed in the vicinity of the steering wheel, a pillar, the dashboard, or a meter panel, or the like. Furthermore, the reporting device 2 may be a loudspeaker that reports to the occupant by converting information to speech or may be a vibrator provided in a position that the occupant is able to sense (for example, the seat of the occupant or the steering wheel, or the like). Moreover, the reporting device 2 may be a combination of the foregoing loudspeaker and vibrator.

The input device 4 is a user interface device that receives operating inputs by the occupant. For example, the input device 4 is a touch panel, a lever, a button, a switch, a joystick, a volume controller or other controller, a sensor such as a camera that recognizes gestures in a non-contact manner, a sensor such as a microphone that recognizes speech, or a combination thereof, which receives information relating to self-driving of a vehicle that is input by the occupant. Furthermore, the input device 4 may also receive an operation signal for switching between self-driving and manual driving. The input device 4 outputs the received information to the driving assistance device 40 as an operation signal.

Figure 2:
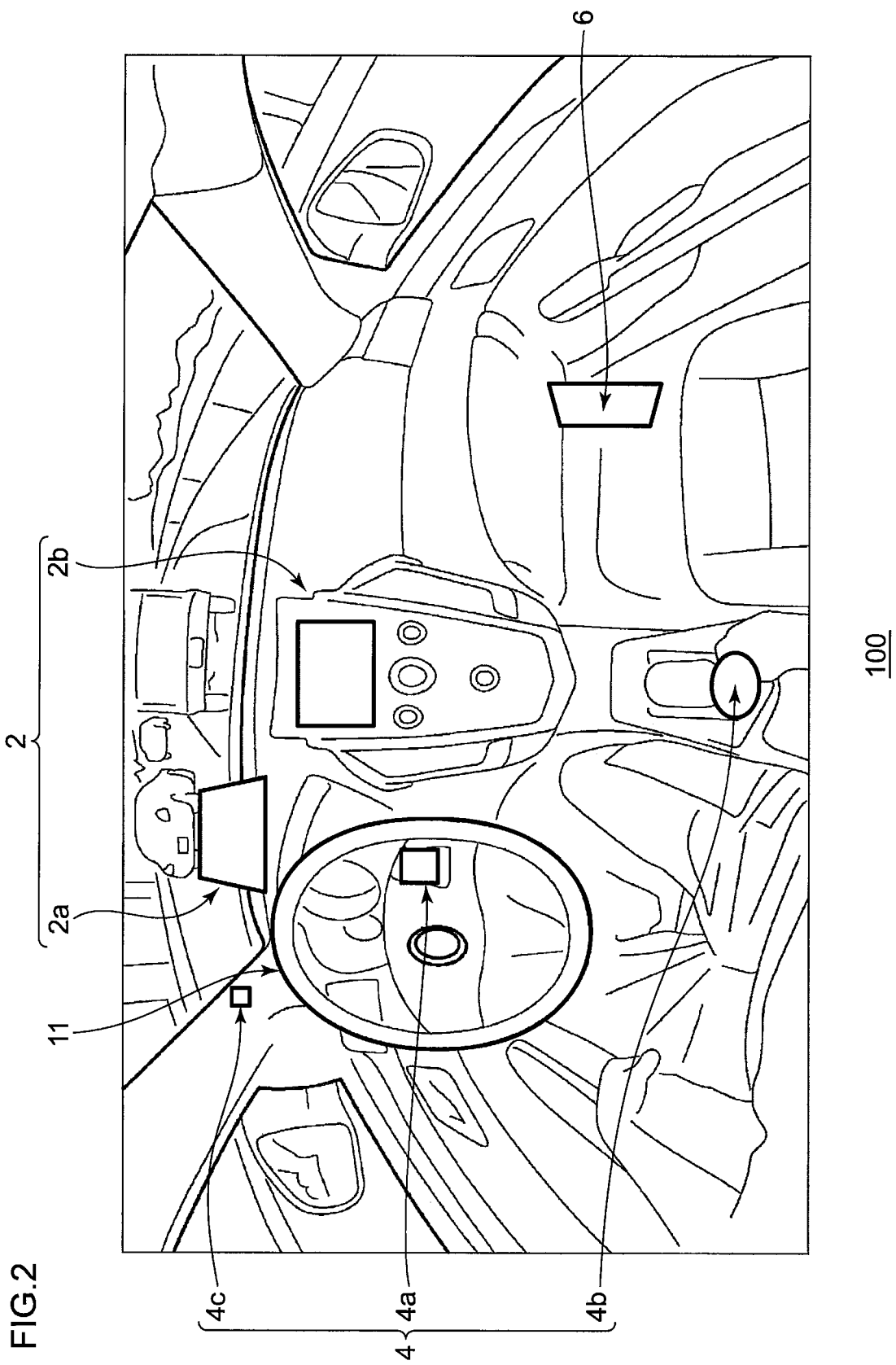
FIG. 2 is a diagram schematically illustrating a cabin of a vehicle according to the first embodiment.

FIG. 2 schematically illustrates the cabin of the vehicle 100. The reporting device 2 may be a head-up display (HUD) 2a or a center display 2b. The input device 4 may be a first operation unit 4a provided on a steering wheel 11, may be a second operation unit 4b provided between the driver seat and the passenger seat, or may be a third operation unit 4c which is a sensor such as a camera that recognizes gestures. The reporting device 2 and the input device 4 may be integrated or may be mounted as a touch panel display, for example. The vehicle 100 may be further provided with a loudspeaker 6 that presents self-driving-related information to the occupant via speech. In this case, the driving assistance device 40 causes the reporting device 2 to display images illustrating the self-driving-related information and/or may present speech conveying the self-driving-related information via the loudspeaker 6. Let us return to FIG. 1.

The wireless device 8 corresponds to a mobile phone communication system or a wireless metropolitan area network (WMAN), or the like, and executes wireless communication. The driving operation unit 10 includes a steering wheel 11, a brake pedal 12, an accelerator pedal 13, and a blinker switch 14. The steering wheel 11, brake pedal 12, accelerator pedal 13, and blinker switch 14 can be electronically controlled by means of a steering ECU, a braking ECU, an engine ECU and a motor ECU, and a blinker controller. In self-driving mode, the steering ECU, braking ECU, engine ECU, and motor ECU drive an actuator in response to control signals supplied from the self-driving control device 30. Furthermore, the blinker controller turns a blinker lamp on or off in response to a control signal that is supplied from the self-driving control device 30.

The detection unit 20 detects the surrounding conditions and the traveling state of the vehicle 100. The detection unit 20 detects, for example, the speed of the vehicle 100, the speed of a preceding vehicle relative to the vehicle 100, the distance of the preceding vehicle from the vehicle 100, the speed of a vehicle in a side lane beside the vehicle 100, the distance of the vehicle in the side lane from the vehicle 100, and position information of the vehicle 100. The detection unit 20 also detects information relating to driver operations and information relating to driver states. The detection unit 20 outputs various detected information (hereinafter called "detected information") to the self-driving control device 30. In addition, the detection unit 20 may output the detected information to the driving assistance device 40 via the self-driving control device 30 or may output the detected information directly to the driving assistance device 40. The detection unit 20 includes a position information acquirer 21, a sensor 22, a speed information acquirer 23, and a map information acquirer 24, and the sensor 22 includes a travel environment sensor 25, a monitoring sensor 26, and a vehicle information sensor 27.

The position information acquirer 21 acquires the current position of the vehicle 100 from a global navigation satellite system (GNSS) receiver. The sensor 22 is a collective term for various sensors for detecting conditions outside the vehicle, states of the vehicle 100, driver operations, and driver states. As sensors 22 for detecting states of the vehicle 100, an acceleration sensor, a gyro sensor, a geomagnetic sensor, and an inclination sensor, and the like, for example, are installed.

The travel environment sensor 25 is a sensor for detecting conditions outside the vehicle. As the travel environment sensor 25, a camera, a millimeter wave radar, LIDAR (light detection and ranging, laser imaging detection and ranging), sonar, a temperature sensor, an air pressure sensor, a humidity sensor, and an illumination sensor, or the like, for example, is installed. The conditions outside the vehicle include the conditions of the road that the vehicle is traveling on, including lane information, the environment including the weather, the conditions surrounding the vehicle, and other vehicles located in the vicinity (other vehicles and the like traveling in adjacent lanes). Any information on circumstances external to the vehicle that can be detected by the travel environment sensor 25 may be used.

The monitoring sensor 26 is a camera installed in the cabin, for example, that images the face of the driver. The monitoring sensor 26 is configured to be capable of imaging the movements of the eyelids of the driver in particular. The vehicle information sensor 27 detects information relating to driver operations such as the steering angle of the steering, the brake pedal depression amount, and the accelerator pedal depression amount. Well-known techniques may be used in this detection and hence a description thereof is omitted here.

The speed information acquirer 23 acquires the current speed of the vehicle 100 from a vehicle speed sensor. The map information acquirer 24 acquires map information on the neighborhood where the vehicle 100 is currently located from a map database. The map database may be recorded on a recording medium in the vehicle 100 or may be downloaded from a map server via a network at the time of use. The map information includes information relating to roads and intersections.

The self-driving control device 30 is a self-driving controller with a built-in self-driving control function and determines the behavior of the vehicle 100 during self-driving. The self-driving control device 30 includes a controller 31, a storage unit 32, and an I/O (inputter/outputter) unit 33. The configuration of the controller 31 can be realized through a collaboration between the hardware resources and software resources or by the hardware resources alone. As the hardware resources, a processor, a read-only memory (ROM), a random-access memory (RAM), and other LSI can be used, and as the software resources, an operating system, an application, and a program such as firmware can be used. The storage unit 32 includes a nonvolatile recording medium such as flash memory. The I/O unit 33 executes communication control according to the various communication formats. For example, the I/O unit 33 outputs self-driving-related information to the driving assistance device 40 and inputs control commands from the driving assistance device 40. In addition, the I/O unit 33 inputs detected information from the detection unit 20.

The controller 31 applies the control commands which are input from the driving assistance device 40 and various information collected from the detection unit 20 or various ECU to a self-driving algorithm to calculate control values for controlling autonomous control targets such as the accelerator throttle aperture and the steering angle, and the like, of the vehicle 100. The controller 31 transmits the calculated control values to each ECU or controller to be controlled. In the present embodiment, the calculated control values are transmitted to the steering ECU, the brake ECU, the engine ECU, and the blinker controller. In the case of an electric vehicle or a hybrid car, the control values are transmitted to a motor ECU instead of/in addition to the engine ECU.

The driving assistance device 40 is an HMI controller that executes an interface function between the vehicle 100 and the occupant and includes a controller 41, a storage unit 42, and an I/O unit 43. The controller 41 executes various data processing of HMI control or the like. The controller 41 can be realized through a collaboration between the hardware resources and software resources or by the hardware resources alone. As the hardware resources, a processor, a ROM, a RAM, and other LSI can be used, and as the software resources, an operating system, an application, and a program such as firmware can be used.

The storage unit 42 is a storage area that stores data which is referenced or updated by the controller 41. For example, the storage unit 42 is realized by a nonvolatile recording medium such as flash memory. The I/O unit 43 executes various communication control according to the various communication formats. The I/O unit 43 includes an operation signal inputter 50, an image/speech outputter 51, a detected information inputter 52, a command interface (I/F) 53, and a communication I/F 56.

The operation signal inputter 50 receives, from the input device 4, an operation signal due to an operation, with respect to the input device 4, by an occupant or by a user outside the vehicle, and outputs the operation signal to the controller 41. The image/speech outputter 51 outputs image data or a speech message generated by the controller 41 to the reporting device 2 so as to cause same to display the image data or the speech message. The detected information inputter 52 receives, from the detection unit 20, the detected information indicating the current conditions surrounding the vehicle 100 and the traveling state thereof, and so forth, which are the results of detection processing by the detection unit 20, and outputs the detected information to the controller 41.

The command I/F 53 executes interface processing for interfacing with the self-driving control device 30 and includes a behavior information inputter 54 and a command outputter 55. The behavior information inputter 54 receives information relating to the self-driving of the vehicle 100 that is transmitted from the self-driving control device 30 and outputs this information to the controller 41. The command outputter 55 receives, from the controller 41, a control command instructing a self-driving mode to the self-driving control device 30 and transmits the control command to the self-driving control device 30.

The communication I/F 56 executes interface processing for interfacing with the wireless device 8. The communication IF 56 transmits data that is output from the controller 41 to the wireless device 8, thereby causing the data to be transmitted from the wireless device 8 to devices external to the vehicle. Furthermore, the communication IF 56 receives data from devices external to the vehicle which has been transferred by the wireless device 8 and outputs this data to the controller 41.

Here, the self-driving control device 30 and the driving assistance device 40 are separate devices. As a modification example, the self-driving control device 30 and the driving assistance device 40 may also be integrated into one controller as indicated by the dotted line in FIG. 1. In other words, one self-driving control device may be configured including the functions of both the self-driving control device 30 and the driving assistance device 40 in FIG. 1.

Figure 3A:
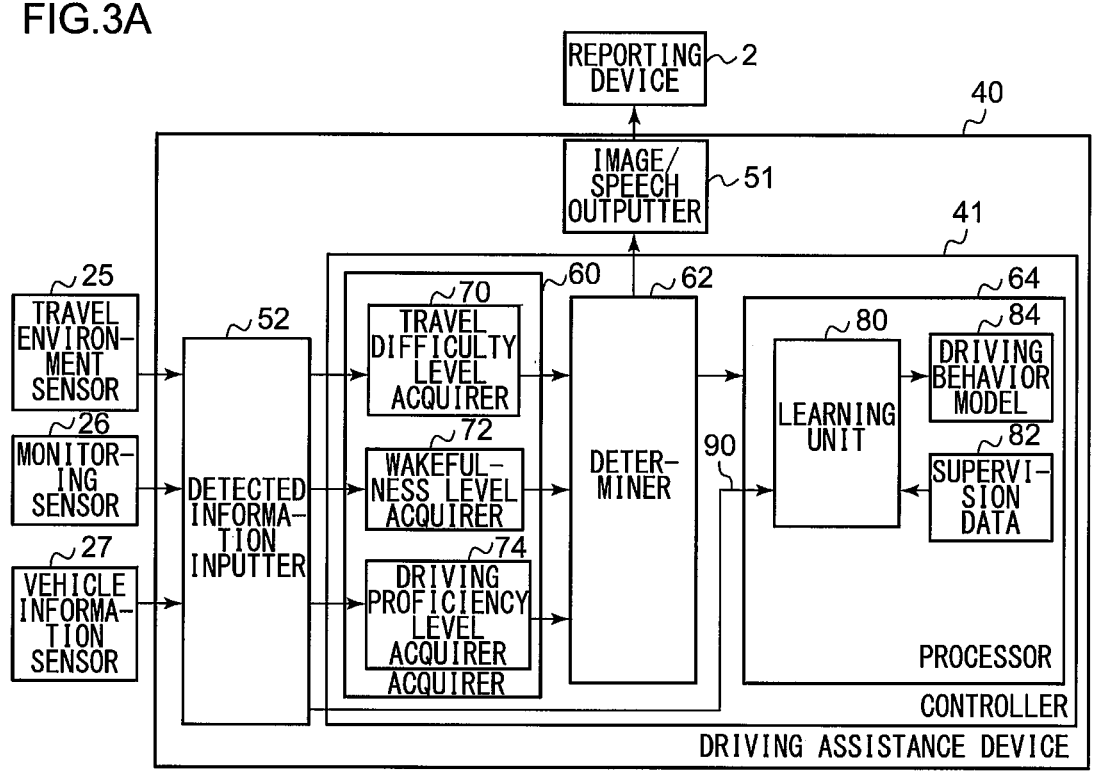
FIGS. 3A and 3B illustrate configurations of a driving assistance device according to the first embodiment.
Figure 3B:
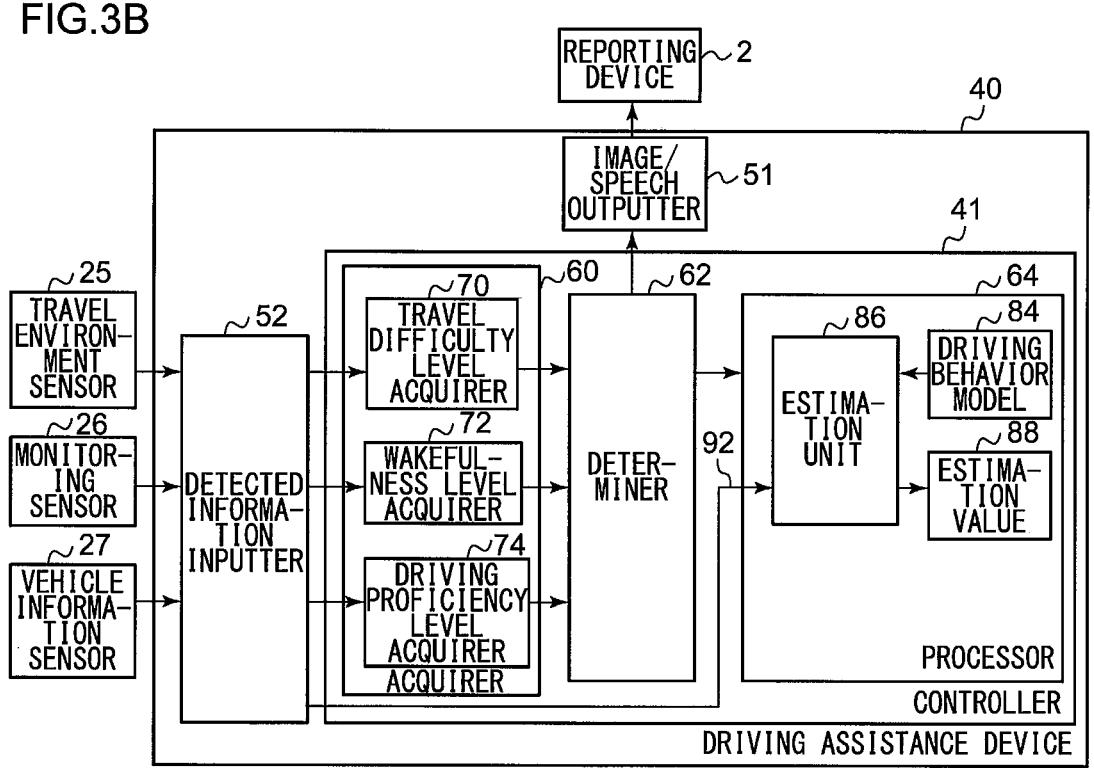

FIGS. 3A and 3B illustrate configurations of the driving assistance device 40. The driving assistance device 40 is configured from one device. However, the assistance system may be configured from one or more devices. For example, the processor 64 may be disposed outside the vehicle 100 and may be coupled to the driving assistance device 40 via the wireless device 8 and a network. In addition, the determiner 62 and the processor 64 may be disposed outside the vehicle 100 or the acquirer 60, the determiner 62, and the processor 64 may be disposed outside the vehicle 100.

FIG. 3A illustrates a configuration relating to learning processing, and FIG. 3B illustrates a configuration relating to estimation processing. Here, estimation processing will be described after describing learning processing. In FIG. 3A, the controller 41 includes the acquirer 60, the determiner 62, and the processor 64. The acquirer 60 includes a travel difficulty level acquirer 70, a wakefulness level acquirer 72, and a driving proficiency level acquirer 74, and the processor 64 includes a learning unit 80, supervision data 82, and a driving behavior model 84. Furthermore, the travel environment sensor 25, monitoring sensor 26, and vehicle information sensor 27 are connected to the detected information inputter 52, and the detected information inputter 52 is connected to the acquirer 60. In addition, the determiner 62 is connected to the image/speech outputter 51, and the image/speech outputter 51 is connected to the reporting device 2.

The travel environment sensor 25 is a camera, a millimeter wave radar, LIDAR, sonar, a temperature sensor, an air pressure sensor, a humidity sensor, and an illumination sensor, or the like. For example, the camera is installed in the vehicle 100 so as to enable imaging of the front of the vehicle 100 but may also be installed in the vehicle 100 so as to enable imaging of the sides or the rear of the vehicle 100. The camera outputs captured video to the detected information inputter 52 as the detected information. The monitoring sensor 26 is a camera installed in the cabin. The monitoring sensor 26 outputs video in which the face of the driver is captured to the detected information inputter 52 as detected information. The vehicle information sensor 27 detects information relating to driver operations such as the steering angle of the steering wheel 11, the depression amount of the brake pedal 12, and the depression amount of the accelerator pedal 13, and the like, and outputs the detected results to the detected information inputter 52 as the detected information.

The driving assistance device 40 executes processing related to the driving behavior model of the vehicle 100. The detected information inputter 52 receives inputs of detected information from the travel environment sensor 25, the monitoring sensor 26, and the vehicle information sensor 27. Such inputs are considered to be inputs of detected information from the vehicle 100. The detected information inputter 52 outputs, among the detected information from the travel environment sensor 25, the video obtained by imaging the front, or the like, of the vehicle 100, to the travel difficulty level acquirer 70. Furthermore, the detected information inputter 52 outputs the detected information from the monitoring sensor 26, that is, the video obtained by imaging the face of the driver, to the wakefulness level acquirer 72, and outputs the detected information from the vehicle information sensor 27, that is, information relating to driver operations, to the driving proficiency level acquirer 74 and the processor 64.

The travel difficulty level acquirer 70 in the acquirer 60 receives the video obtained by imaging the front, or the like, of the vehicle 100 from the detected information inputter 52. The travel difficulty level acquirer 70 detects other vehicles included in the video by performing image recognition processing on the video. Furthermore, the travel difficulty level acquirer 70 determines the number of other vehicles traveling in front of the vehicle 100. The travel difficulty level acquirer 70 outputs the number of other vehicles to the determiner 62 as the travel difficulty level. This travel difficulty level rises as the number of other vehicles increases and drops as the number of other vehicles is reduced. The number of other vehicles traveling other than the vehicles in front of the vehicle 100 may also be included in the travel difficulty level. Thereupon, the weighting of other vehicles traveling in front and of other vehicles traveling in a position other than in front may be changed by counting one other vehicle traveling in a position other than in front of vehicle 100 as 0.5 vehicle. Furthermore, the number of other vehicles close to the vehicle 100, the number of other vehicles braking in front of vehicle 100, and the number of other vehicles overtaking vehicle 100 may be reflected in the travel difficulty level. The weighting for such numbers may be increased, for example. The travel difficulty level acquirer 70 outputs the travel difficulty level to the determiner 62. The travel difficulty level may be acquired from map information such as the road width and shape of the road being traveled on, and road restrictions such as U turn prohibitions, right and left turn prohibitions, and the like. In such cases, the travel difficulty level increases as the road width narrows, the shape becomes more complex, and the number of restrictions increases, for example. The travel difficulty level may also be acquired from detected information on neighboring vehicles acquired by on-vehicle sensors, the state of the road surface, and the state of the weather. In such cases, the travel difficulty level increases as congestion or the average speed increases, as course rectilinearity drops, with more road surface irregularities, snowy or rainy weather, or more night driving, or as the combination thereof increases, for example.

The wakefulness level acquirer 72 in the acquirer 60 receives the video obtained by imaging the face of the driver from the detected information inputter 52, and by performing image recognition processing on the images, recognizes the facial expressions of the driver. The wakefulness level acquirer 72 estimates the wakefulness level of the driver as a driver state on the basis of the recognized facial expressions. Well-known techniques may be used in the image recognition processing and in the wakefulness level estimation, but the opening level of the eyelids of the driver, closing of the eyes, PERCLOS (PERcent of eyelid CLOSure), vestibulo ocular reflex (VOR) or a combination thereof, is used, for example. The eyelid opening level is the extent to which the eyes are open, and a value obtained by dividing the distance from the upper eyelid to the lower eyelid by the diameter of the iris is used. Furthermore, processing not directed toward estimating the wakefulness level may be carried out by using, as blinks, an eyelid opening level of 20% or less and eyelid movements of 70 to 500 milliseconds in duration at time intervals of 500 milliseconds or more. Closing of the eyes is movement of the eyelids at an eyelid opening level of 20% or less and eyelid movements of at least 500 milliseconds in duration. PERCLOS is an index for measuring the fatigue level of drivers authorized by the American Road Safety Association and is a percentage of the time the eyes were closed during the previous minute. The vestibulo ocular reflex is an accompanying eyeball movement that causes inversion of the eyeballs at substantially the same speed as the head moves and suppresses blurring of the image of the outside world on the retina, and is used as a drowsiness indicator in cases where VOR gain, which represents a compensation ratio for eyeball movement when the head is moving during driving in a wakeful state, is equal to or less than a threshold value, and in cases where a VOR error indicating a variation in the VOR is equal to or greater than the threshold value, continuously for 30 seconds or more, respectively. In addition, as an example of the wakefulness level of the driver, here, a drowsiness level, as specified in the NEDO (New Energy and Industrial Technology Development Organization) evaluation method for detecting drowsiness from facial expressions, is employed. According to this specification, drowsiness levels are evaluated in five stages from 1 to 5. More specifically, the drowsiness levels are classified as "drowsiness level 1": does not seem at all sleepy, "drowsiness level 2": seems a bit sleepy, "drowsiness level 3": seems sleepy, "drowsiness level 4": seems quite sleepy, and "drowsiness level 5": seems very sleepy.

The wakefulness level acquirer 72 estimates the drowsiness level to be "drowsiness level 1" in cases where line of sight movement is early and frequent, on a stable blinking cycle of about two blinks every two seconds, and where movement is lively and accompanied by body movement. In addition, the wakefulness level acquirer 72 estimates the drowsiness level to be "drowsiness level 2" if the lips are open and line-of-sight movement is slow. Further, the wakefulness level acquirer 72 estimates the drowsiness level to be "drowsiness level 3" if blinking is slow and occurs frequently, there is mouth movement, a shift in sitting position, and a hand is raised to the face. Furthermore, the wakefulness level acquirer 72 estimates the drowsiness level to be "drowsiness level 4" if blinking deemed to be conscious occurs, if there is unnecessary movement of the whole body such as nodding and up-and-down movement of the shoulders, if yawning is frequent and deep breathing is also observed, and if blinking and line-of-sight movement are slow. In addition, the wakefulness level acquirer 72 estimates the drowsiness level to be "drowsiness level 5" if the eyelids are closed, the head tilts forward or the head falls backward. In these stipulations, it may be said that the wakefulness level rises with increasing proximity to drowsiness level 1 and the wakefulness level falls with increasing proximity to drowsiness level 5. The wakefulness level acquirer 72 outputs the wakefulness level to the determiner 62.

The driving proficiency level acquirer 74 in the acquirer 60 receives information relating to driver operations from the detected information inputter 52, such as, for example, the steering angle of the steering wheel 11, the depression amount of the brake pedal 12, and the depression amount of the accelerator pedal 13, and the like. The driving proficiency level acquirer 74 derives the driving proficiency level on the basis of the steering angle of the steering wheel 11, the depression amount of the brake pedal 12 and the depression amount of the accelerator pedal 13. To describe this processing in specific terms, the driving proficiency level acquirer 74 pre-stores correspondence between driving proficiency levels and a plurality of patterns of the steering angle of the steering wheel 11, the depression amount of the brake pedal 12, and the depression amount of the accelerator pedal 13. Furthermore, the driving proficiency level acquirer 74 selects, from among the plurality of patterns included in the correspondence, the closest pattern to the received steering angle of the steering wheel 11, the depression amount of the brake pedal 12, and the accelerator pedal 13, and derives a driving proficiency level that corresponds to the selected pattern. Here, if the driver is accustomed to driving, the driving proficiency level is high, and if the driver is not accustomed to driving, the driving proficiency level is low. The driving proficiency level acquirer 74 outputs the driving proficiency level to the determiner 62. Note that the driving proficiency level is assumed to be higher as jerks (rapid acceleration), which are time-dependent changes in acceleration in vehicle behavior resulting from driving, become more minimal, for example. In addition, the driving proficiency level may be derived from proximity between the current driving state and a driving model (exemplary model) of a model driver, and the driving proficiency level may be assumed to be higher as this proximity increases, for example. Alternatively, the driving proficiency level may be assumed to be higher on the basis of vehicle behavior due to driving by the current driver, for example, as the frequency of sudden braking and sudden steering drops, or as the frequency of sudden braking and sudden steering drops in combination with a high travel difficulty level.

The travel difficulty level is the task demand of driving behavior, for example. The task demand is "the amount or allocation of warnings felt to be necessary to achieve a performance level which a certain driver is aspiring to, the depth of information processing, or the operation content to be performed", and is not always fixed, varying according to road structures such as straight and curved sections and intersections, the existence and movements of preceding and adjacent vehicles, and traffic situations such as a large number of road users. In addition, the task demand increases as vehicle speed rises even for the same road structures and traffic situations. Moreover, the task demand increases even at the same vehicle speed when traveling on a road the driver is not accustomed to and drops when the driver is traveling on a road which is always taken on a commute or the like.

The determiner 62 receives the travel difficulty level from the travel difficulty level acquirer 70, the wakefulness level from the wakefulness level acquirer 72, and the driving proficiency level from the driving proficiency level acquirer 74. The determiner 62 makes a determination of whether or not to execute processing on the basis of at least one of the travel difficulty level, the wakefulness level, and the driving proficiency level. For the processing, learning is illustrated in FIG. 3A and estimation is illustrated in FIG. 3B. Here, the processing of the determiner 62, from the first determination processing to the sixth determination processing, will be described in that order. The first determination processing to the third determination processing uses two information items from among the travel difficulty level, the wakefulness level, and the driving proficiency level. Here, any of the travel difficulty level acquirer 70 to the driving proficiency level acquirer 74, which is generating information that is not used, may be omitted. Meanwhile, the fourth determination processing to the sixth determination processing uses any information item from among the travel difficulty level, the wakefulness level, and the driving proficiency level. Here, two of the travel difficulty level acquirer 70 to the driving proficiency level acquirer 74, which are generating information that is not used, may be omitted.

1. First Determination Processing

In first determination processing, the travel difficulty level and the wakefulness level are used. FIGS. 4A to 4C illustrate configurations of tables stored in the determiner 62. FIG. 4A is a table used in the first determination processing. The travel difficulty level is plotted on the horizontal axis and the wakefulness level is plotted on the vertical axis. In a case where the travel difficulty level is equal to or less than a first threshold value TDa, if the wakefulness level is equal to or greater than a second threshold value Aa and equal to or less than a third threshold value Ac, the determiner 62 makes a determination to execute processing. Here, the third threshold value Ac>the second threshold value Aa. In a case where the travel difficulty level is equal to or less than the first threshold value TDa, if the wakefulness level is below the second threshold value Aa or the wakefulness level is above the third threshold value Ac, the determiner 62 makes a determination to not execute processing.

On the other hand, in a case where the travel difficulty level is above the first threshold value TDa, if the wakefulness level is equal to or greater than a fourth threshold value Ab, the determiner 62 makes a determination to execute processing. Here, the third threshold value Ac>the fourth threshold value Ab>the second threshold value Aa. In a case where the travel difficulty level is above the first threshold value TDa, if the wakefulness level is below the fourth threshold value Ab, the determiner 62 makes a determination to not execute processing. Here, this processing will be described in greater detail using FIGS. 5A to 5C.

Figure 5A:
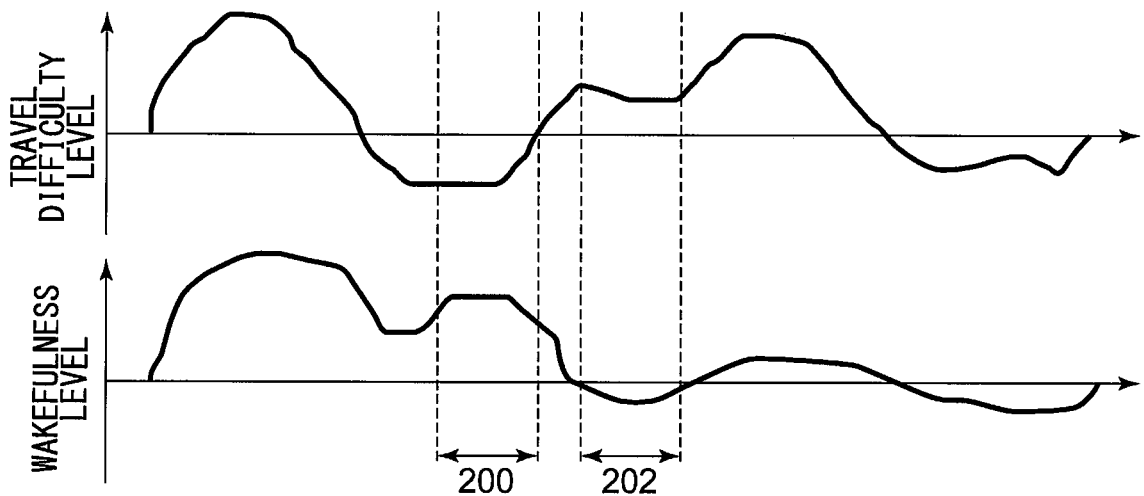
FIGS. 5A, 5B, and 5C provide an overview of processing of the table in FIG. 4A.
Figure 5B:
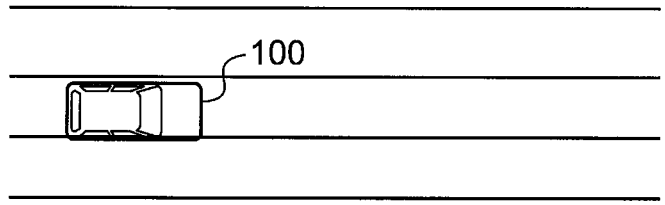
Figure 5C:
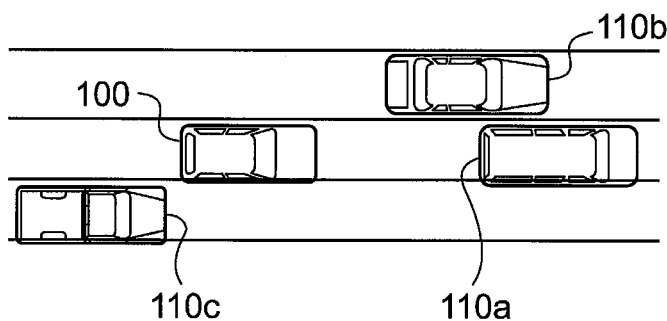

FIGS. 5A to 5C illustrate an overview of the processing according to the table in FIG. 4A. FIG. 5A illustrates time-dependent changes in the travel difficulty level and wakefulness level. In a first segment 200, the travel difficulty level is low. A state where the travel difficulty level is low is illustrated as per FIG. 5B. Here, only the vehicle 100 is traveling and other vehicles are not traveling in the vicinity thereof. In such a situation, the wakefulness level due to driving is typically not high. However, in the first segment 200, the wakefulness level is high. Hence, it may be said that the reason the wakefulness level is high is not driving. Thus, it may be said that the combination of the travel difficulty level and the wakefulness level in the first segment 200 is a state which is unsuitable for learning. The determiner 62 makes a determination to not execute processing in such cases.

In a second segment 202, the travel difficulty level is high. A state where the travel difficulty level is high is illustrated as per FIG. 5C. Here, a first other vehicle 110*a* to a third other vehicle 110*c* are traveling in the vicinity of the vehicle 100 which is traveling. In such a situation, there is typically a tendency for the wakefulness level to be high due to driving. However, in the first segment 200, the wakefulness level is low due to drowsiness. Thus, it may be said that the combination of the travel difficulty level and the wakefulness level in the second segment 202 is a state which is unsuitable for learning. The determiner 62 makes a determination to not execute processing in such cases. Let us return to FIG. 3A.

2. Second Determination Processing

In second determination processing, the wakefulness level and the driving proficiency level are used. FIG. 4B is a table used in the second determination processing. The driving proficiency level is plotted on the horizontal axis and the wakefulness level is plotted on the vertical axis. DSa and DSb are specified as threshold values for the driving proficiency level. DSa<DSb. Furthermore, Ad and Ae are specified as threshold values for the wakefulness level. Ad<Ae. The determiner 62 makes a determination to not execute processing irrespective of the wakefulness level if the driving proficiency level is equal to or less than DSa. In a case where the driving proficiency level is above DSa and equal to or less than DSb, if the wakefulness level is equal to or greater than Ae, the determiner 62 makes a determination to execute processing but makes a determination to not execute processing if the wakefulness level is below Ae. In a case where the driving proficiency level is above DSb, if the wakefulness level is equal to or greater than Ad, the determiner 62 makes a determination to execute processing but makes a determination to not execute processing if the wakefulness level is below Ad. It may be said that the threshold values for the wakefulness level are set lower as the driving proficiency level increases.

3. Third Determination Processing

In third determination processing, the travel difficulty level and the driving proficiency level are used. FIG. 4C is a table used in the third determination processing. The driving proficiency level is plotted on the horizontal axis and the travel difficulty level is plotted on the vertical axis. DSa, DSb and DSc are specified as threshold values for the driving proficiency level. DSa<DSb<DSc. Furthermore, TDb, TDc and TDd are specified as threshold values for the travel difficulty level. TDb<TDc<TDd. The determiner 62 makes a determination to not execute processing irrespective of the travel difficulty level if the driving proficiency level is equal to or less than DSa. In a case where the driving proficiency level is above DSa and equal to or less than DSb, if the travel difficulty level is equal to or less than TDb, the determiner 62 makes a determination to execute processing, but makes a determination to not execute processing if the travel difficulty level is above TDb. In a case where the driving proficiency level is above DSb and the driving proficiency level is equal to or less than DSc, if the travel difficulty level is equal to or less than TDc, the determiner 62 makes a determination to execute processing but makes a determination to not execute processing if the travel difficulty level is above TDc. In a case where the driving proficiency level is above DSc, if the travel difficulty level is equal to or less than TDd, the determiner 62 makes a determination to execute processing but makes a determination to not execute processing if the travel difficulty level is above TDd. It may be said that the threshold value for the travel difficulty level is set higher as the driving proficiency level increases.

4. Fourth Determination Processing

In fourth determination processing, the travel difficulty level is used. If the travel difficulty level is equal to or less than a threshold value, the determiner 62 makes a determination to execute processing. If the travel difficulty level is above the threshold value, the determiner 62 makes a determination to not execute processing.

5. Fifth Determination Processing

In fifth determination processing, a wakefulness level is used. The determiner 62 executes processing as per a case where the travel difficulty level is equal to less than the first threshold value TDa in the first determination processing. That is, the determiner 62 makes a determination to execute processing if the wakefulness level is equal to or greater than Aa and equal to or less than Ac. As mentioned earlier, value Ac>Aa. If the wakefulness level is below Aa or the wakefulness level is above value Ac, the determiner 62 makes a determination to not execute processing.

6. Sixth Determination Processing

In sixth determination processing, the driving proficiency level is used. If the driving proficiency level is equal to or greater than a threshold value, the determiner 62 makes a determination to execute processing. If the driving proficiency level is below a threshold value, the determiner 62 makes a determination to not execute processing.

Figure 6A:
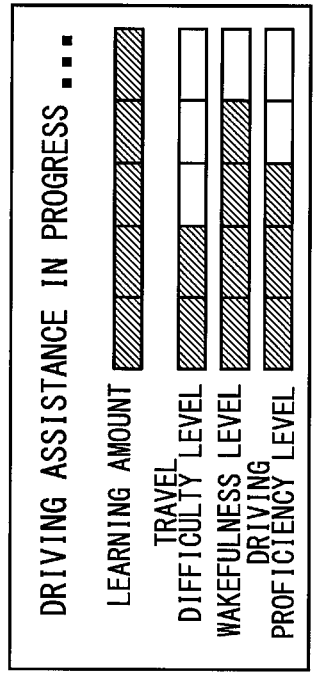
FIGS. 6A, 6B, 6C, and 6D illustrate screens displayed on a reporting device of FIGS. 3A and 3B.
Figure 6C:
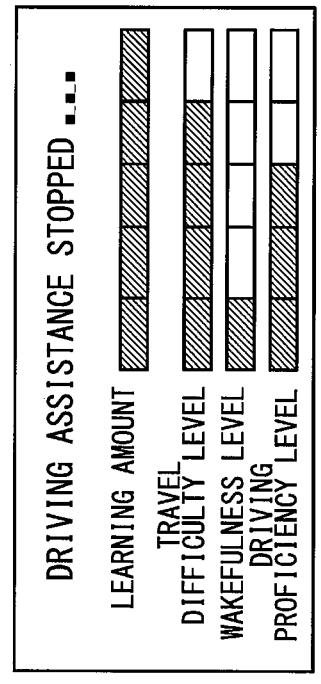
Figure 6B:
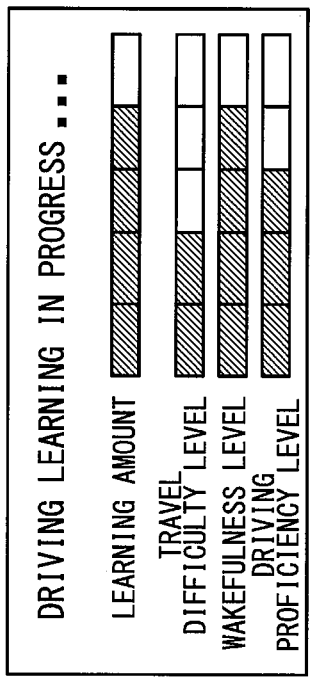
Figure 6D:
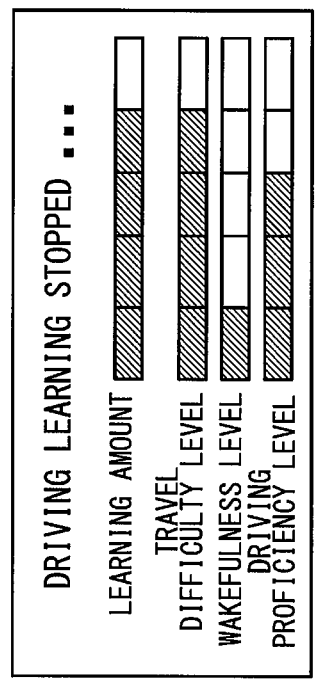

By combining processing, from the first determination processing to the third determination processing, the determiner 62 may determine whether or not to execute processing on the basis of a combination of the travel difficulty level, the wakefulness level, and the driving proficiency level. The determiner 62 outputs the determination result, that is, information relating to whether or not to execute learning, to the image/speech outputter 51 and the processor 64. The image/speech outputter 51 causes the reporting device 2 to display the information relating to whether or not to execute learning. FIGS. 6A to 6D illustrate screens which are displayed on the reporting device 2. FIG. 6A illustrates a screen in a case where a determination to execute learning has been made. Here, it is assumed that the determination is made on the basis of a combination of the travel difficulty level, the wakefulness level, and the driving proficiency level. FIG. 6B illustrates a screen in a case where a determination to not execute learning has been made. FIGS. 6C and 6D will be described subsequently. Let us return to FIG. 3A.

It is assumed that the processor 64 executes learning if the determiner 62 has made a determination to execute learning but does not execute learning if the determiner 62 has made a determination to not execute learning. A case where learning is executed will be described hereinbelow. The learning unit 80 receives, as input parameters 90, driver operation-related information from the detected information inputter 52. Furthermore, the learning unit 80 acquires, as supervision data 82, a future variation amount which is associated with the driver operation-related information. Future means a few seconds later or a few minutes later, for example. The learning unit 80 executes processing on the basis of the input parameters 90, and more specifically learning processing to cause the driving behavior model 84 to learn. To describe this in specific terms, the learning unit 80 adjusts the driving behavior model 84 by means of the driver operation-related information, which is the input parameters 90, and the supervision data 82. In other words, by inputting the input parameters 90 to a neural network, the learning unit 80 adjusts the weighting parameters and the like of the neural network such that the supervision data 82 is obtained as an output. As a result of this adjustment, the learning unit 80 causes the neural network to learn the relationship between the input parameters 90 and the supervision data 82. As a result, the driving behavior model 84 is constructed.

Figure 7A:
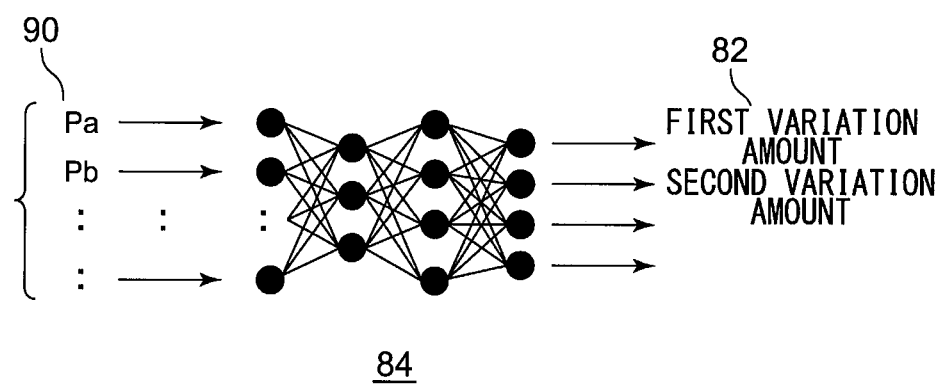
FIGS. 7A and 7B provide an overview of processing by the processor of FIGS. 3A and 3B.
Figure 7B:
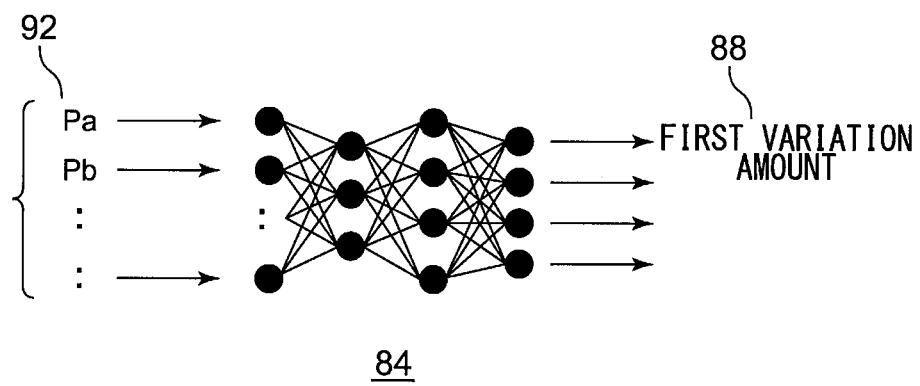

FIGS. 7A and 7B provide an overview of processing by the processor 64. FIG. 7A provides an overview of the learning processing of the learning unit 80. The learning unit 80 inputs a plurality of input parameters 90 including parameters Pa and Pb, and the like, which are indicated as driver operation-related information, to the neural network. The learning unit 80 optimizes the weighting parameters of the neural network so that the output from the neural network is the supervision data 82 and matches the supervision data 82 associated with the input parameters 90. The neural network thus constructed is the driving behavior model 84. Learning is not limited to using supervision data and may, for example, be learning without supervision data (so-called unsupervised learning). FIG. 7B will be described subsequently.

Estimation processing will be described next using FIG. 3B. In FIG. 3B, the controller 41 includes the acquirer 60, the determiner 62, and the processor 64. The acquirer 60 includes the travel difficulty level acquirer 70, the wakefulness level acquirer 72, and the driving proficiency level acquirer 74, and the processor 64 includes the driving behavior model 84, an estimation unit 86, and an estimation value 88. Furthermore, the travel environment sensor 25, monitoring sensor 26, and vehicle information sensor 27 are connected to the detected information inputter 52, and the detected information inputter 52 is connected to the acquirer 60. In addition, the determiner 62 is connected to the image/speech outputter 51, and the image/speech outputter 51 is connected to the reporting device 2. The acquirer 60 and the determiner 62 execute processing as per FIG. 3A, and hence a description thereof is omitted here.

The determiner 62 outputs the determination result, that is, information relating to whether or not to execute estimation, to the image/speech outputter 51 and the processor 64. The image/speech outputter 51 causes the reporting device 2 to display the information relating to whether or not to execute estimation. FIG. 6C illustrates a screen in a case where a determination to execute estimation has been made. Here also, it is assumed that the determination is made on the basis of a combination of the travel difficulty level, the wakefulness level, and the driving proficiency level. FIG. 6D illustrates a screen in a case where a determination to not execute estimation has been made. Let us return to FIG. 3B.

It is assumed that the processor 64 executes estimation if the determiner 62 has made a determination to execute estimation but does not execute estimation if the determiner 62 has made a determination to not execute estimation. A case where estimation is executed will be described hereinbelow. The estimation unit 86 receives, as input data 92, driver operation-related information from the detected information inputter 52. The estimation unit 86 executes processing on the basis of the input data 92, and, more specifically, estimation processing to estimate a future variation amount. To describe this in specific terms, the estimation unit 86 inputs the input data 92 to the driving behavior model 84 and acquires the estimation value 88 from the driving behavior model 84. The estimation value 88 is a future variation amount.

FIG. 7B provides an overview of the estimation processing of the estimation unit 86. The estimation unit 86 inputs the input data 92 represented as the detection result to the neural network. Thus, the estimation unit 86 acquires, as the estimation value 88, the future variation amount that is output from the neural network. The self-driving control device 30 in FIG. 1 controls the self-driving of the vehicle 100 on the basis of the future variation amount acquired in the estimation unit 86.

Figure 8:
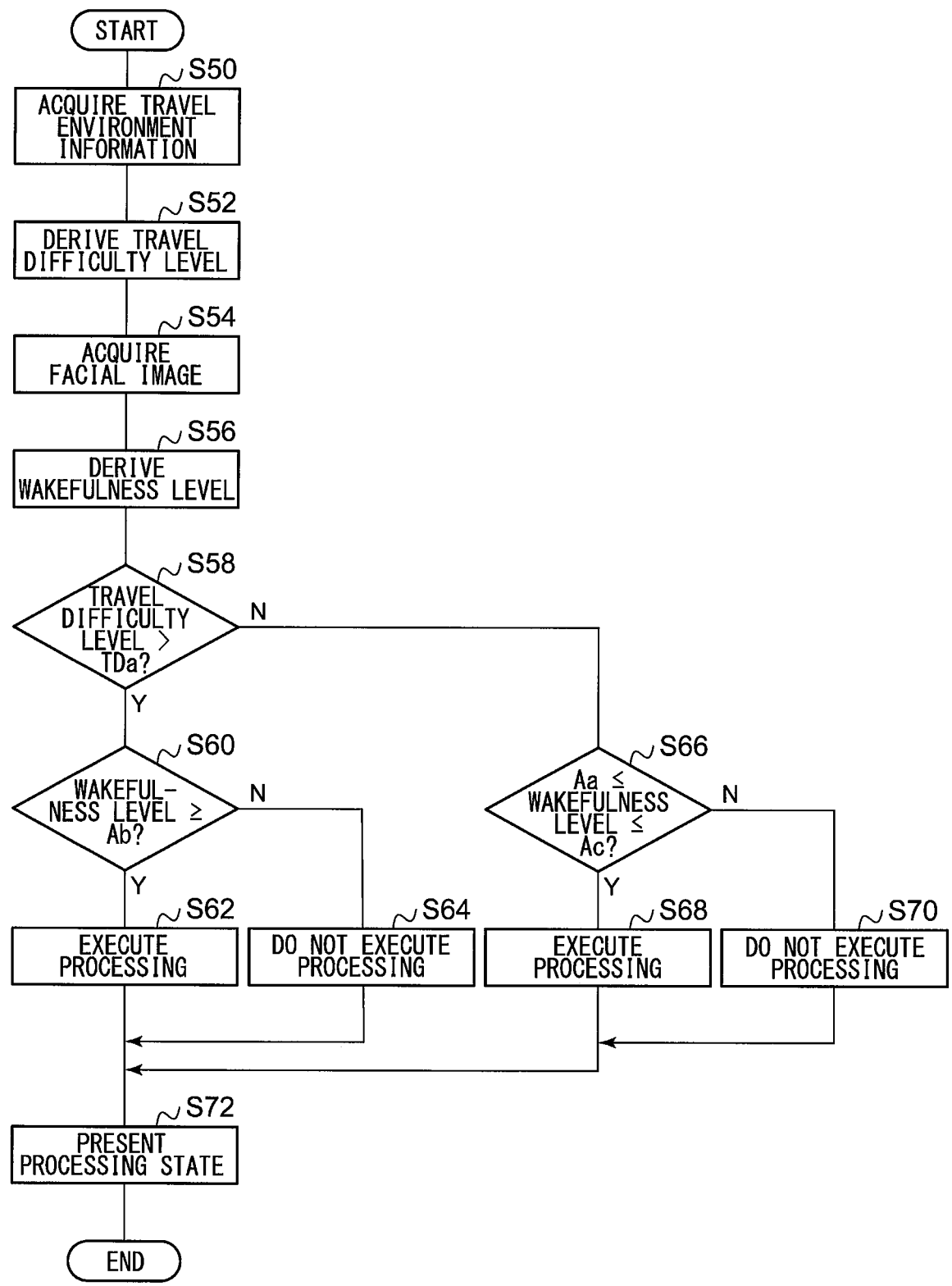
FIG. 8 is a flowchart illustrating a processing procedure by the driving assistance device of FIGS. 3A and 3B.

The functioning of the driving assistance device 40 according to the foregoing configuration will now be described. FIG. 8 is a flowchart illustrating a processing procedure by the driving assistance device 40. The detected information inputter 52 acquires travel environment information (S50). The travel difficulty level acquirer 70 derives the travel difficulty level (S52). The detected information inputter 52 acquires a facial image (S54). The wakefulness level acquirer 72 derives the wakefulness level (S56). If the travel difficulty level is greater than TDa (Y in S58) and the wakefulness level is equal to or greater than Ab (Y in S60), the determiner 62 makes a determination to execute processing (S62). If the wakefulness level is not equal to or greater than Ab (N in S60), the determiner 62 makes a determination to not execute processing (S64). If the travel difficulty level is not greater than TDa (N in S58) and the wakefulness level is equal to or greater than Aa and equal to or less than Ac (Y in S66), the determiner 62 makes a determination to execute processing (S68). If the wakefulness level is not equal to or greater than Aa or not equal to or less than Ac (N in S66), the determiner 62 makes a determination to not execute processing (570). The reporting device 2 displays a processing state (S72).

Figure 9:
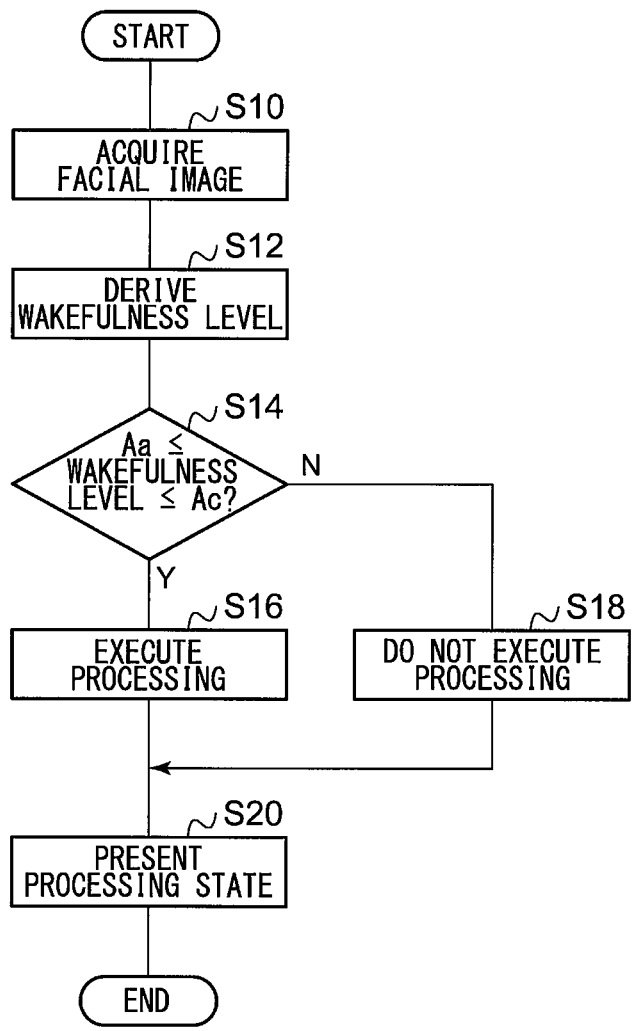
FIG. 9 is a flowchart illustrating another processing procedure by the driving assistance device of FIGS. 3A and 3B.

FIG. 9 is a flowchart illustrating another processing procedure by the driving assistance device 40. The detected information inputter 52 acquires a facial image (S10). The wakefulness level acquirer 72 derives the wakefulness level (S12). If the wakefulness level is equal to or greater than Aa and equal to or less than Ac (Y in S14), the determiner 62 makes a determination to execute processing (S16). If the wakefulness level is not equal to or greater than Aa or not equal to or less than Ac (N in S14), the determiner 62 makes a determination to not execute processing (S18). The reporting device 2 displays a processing state (S20).

According to this embodiment, because a determination of whether or not to execute processing is made on the basis of at least one of the travel difficulty level, the wakefulness level, and the driving proficiency level, execution of learning or estimation in states which are unsuitable for learning or estimation can be suppressed. Furthermore, because a determination of whether or not to execute processing is made on the basis of a combination of two or more information items from among the travel difficulty level, the wakefulness level, and the driving proficiency level, the determination accuracy can be improved. In addition, because a determination to not execute processing is made on the basis of a combination of the travel difficulty level and the wakefulness level, the threshold values for the wakefulness level can be modified according to the travel difficulty level. Further, because the threshold values for the wakefulness level change according to the travel difficulty level, the determination accuracy can be improved. In addition, because a determination to not execute processing is made on the basis of a combination of the wakefulness level and the driving proficiency level, the threshold values for the wakefulness level can be modified according to the driving proficiency level. Further, because the threshold values for the wakefulness level change according to the driving proficiency level, the determination accuracy can be improved. In addition, because a determination to not execute processing is made on the basis of a combination of the travel difficulty level and the driving proficiency level, the threshold values for the travel difficulty level can be modified according to the driving proficiency level. Further, because the threshold values for the travel difficulty level change according to the driving proficiency level, the determination accuracy can be improved.

Furthermore, because a determination to not execute processing is made if the travel difficulty level is high, it is possible to suppress the execution of learning or estimation in cases where using a driving behavior model is unsuitable due to the travel difficulty level being high. Furthermore, because a determination to not execute processing is made if the wakefulness level is low, it is possible to suppress the execution of learning or estimation in cases where using a driving behavior model is unsuitable due to the wakefulness level being low. In addition, because a determination to not execute processing is made if the driving proficiency level is low, it is possible to suppress the execution of learning or estimation in cases where using a behavior model is unsuitable due to the driving proficiency level being low. Furthermore, because a determination is made of whether or not to execute learning, the execution of learning in states which are unsuitable for learning can be suppressed. In addition, because a determination is made of whether or not to execute estimation, the execution of estimation in states which are unsuitable for estimation can be suppressed. Note that the form of the display illustrated in FIG. 6 is not limited to or by the embodiment. For example, the display may indicate only whether or not learning is taking place or only whether or not estimation is taking place.

Second Embodiment

A second embodiment will be described next. Similarly to the first embodiment, the second embodiment relates to an assistance system capable of switching between executing or not executing learning processing or estimation processing depending on the situation. In the first embodiment, the assistance system is used in self-driving of an automobile and learning processing or estimation processing for a driving behavior model is executed by the assistance system. However, in the second embodiment, the assistance system is used in a voice agent system. The voice agent system is also called a voice assistant system and combines speech recognition processing with natural language processing to respond and function suitably in response to utterances by a speaker. For example, a speaker makes utterances to a smartphone, a tablet-type terminal, or a smart speaker (hereinafter collectively called "terminal devices") and processing is carried out in a server apparatus which is coupled to the terminal devices via a network. In a voice agent system of this kind, there is a need to shorten the response period until a response or action occurs after an utterance is made by the speaker. In order to shorten the response period, the content of the utterance is estimated while the utterance is being made by the speaker, by employing an assistance system in the voice agent system. In this assistance system, learning processing or estimation processing for an utterance behavior model is executed.

Here, an "utterance behavior estimation engine" may be configured as per the "driving behavior estimation engine". Furthermore, an "utterance behavior model" is uniquely determined according to the utterance behavior estimation engine. An utterance behavior model in the case of DL is a learned neural network, an utterance behavior model in the case of SVM is a learned prediction model, and an utterance behavior model in the case of collaborative filtering is data obtained by associating utterance data with response data for utterances. An utterance behavior model in the case of rules is data obtained by associating inputs with outputs.

On the basis of such definitions, when learning processing or estimation processing for an utterance behavior model is executed in cases where the state is not a state suitable for utterances, the accuracy of the learning or estimation is then low. Cases where the state is not a state suitable for utterances include cases where an utterance of content that has not been planned for learning or estimation is made and cases where an utterance by an unplanned speaker is made. In such cases, it is preferable to not perform learning or estimation. To deal with this situation, according to the present embodiment, the utterance content and/or speaker of the utterance is acquired, and a determination of whether or not to execute learning or estimation processing is made on the basis of the utterance content and/or the speaker of the utterance. Learning or estimation is executed if a determination to execute processing has been made and learning or estimation is not executed if a determination to not execute processing has been made. The description hereinbelow will focus on the differences from the foregoing.

Figure 10:
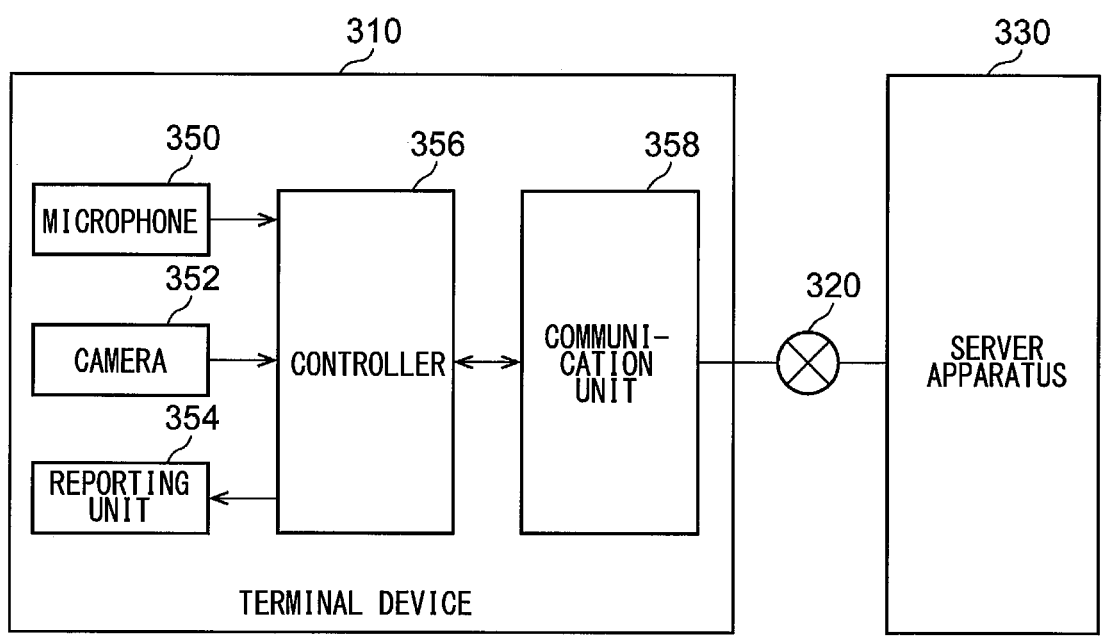
FIG. 10 is a diagram illustrating a configuration of a voice agent system according to a second embodiment.

FIG. 10 illustrates a configuration of a voice agent system 300. The voice agent system 300 includes a terminal device 310, a network 320, and a server apparatus 330. The terminal device 310 includes a microphone 350, a camera 352, a reporting unit 354, a controller 356, and a communication unit 358. The terminal device 310 is a smartphone, a tablet-type terminal, or a smart speaker, as mentioned earlier. The microphone 350 collects speech uttered by a speaker. The microphone 350 converts the speech to a digital signal (hereinafter also called "speech") and outputs the digital signal to the controller 356. Because a well-known technique may be used for this conversion, a description thereof is omitted here. The camera 352 is an imaging device capable of imaging the face of the speaker. The images captured by the camera 352 may be still images or moving images. The camera 352 converts the images to a digital signal (hereinafter also called "images") and outputs the digital signal to the controller 356.

The controller 356 receives speech from the microphone 350 and receives images from the camera 352. The controller 356 outputs at least one of the foregoing received information to the communication unit 358. The communication unit 358 receives the information from the controller 356. The communication unit 358 is capable of executing wireless communication and is connected to the network 320 through wireless communication. The communication unit 358 transmits information to the server apparatus 330 via the network 320. Because a well-known technique may be used for the wireless communication performed by the communication unit 358, a description thereof is omitted here. The communication unit 358 may also execute wired communication.

The server apparatus 330 receives the information from the terminal device 310 via the network 320. The server apparatus 330 recognizes the content of speech in the received information by subjecting the speech to speech recognition processing and natural language processing. The server apparatus 330 executes processing according to the speech content. For example, if the content of the speech is "give me the weather forecast for today in Tokyo", the server apparatus 330 accesses a weather forecast server (not illustrated) via the network 320 and receives the "weather forecast for today in Tokyo" from the weather forecast server. The server apparatus 330 transmits information (hereinafter called "response information") indicated by the "weather forecast for today in Tokyo" to the terminal device 310 via the network 320. Because a well-known technique may be used for such processing by the server apparatus 330, a description thereof is omitted here.

The communication unit 358 of the terminal device 310 receives response information from the server apparatus 330. The communication unit 358 outputs the content included in the response information, for example, the "weather forecast for today in Tokyo" to the controller 356. The controller 356 is notified of the content received from the communication unit 358 by the reporting unit 354. If the reporting unit 354 is a display, the controller 356 causes the display to display the "weather forecast for today in Tokyo". If the reporting unit 354 is a loudspeaker, the controller 356 provides speech for the "weather forecast for today in Tokyo" via the loudspeaker.

FIGS. 11A and 11B illustrate configurations of an assistance system 400. The assistance system 400 may be one device or may be a combination of a plurality of devices. If the assistance system 400 is one device, the assistance system 400 corresponds to the server apparatus 330 of FIG. 10. If the assistance system 400 is two or more devices, the assistance system 400 corresponds to a combination of the terminal device 310 and the server apparatus 330 in FIG. 10. The assistance system 400 may include a device not illustrated in FIG. 10. FIG. 11A illustrates a configuration relating to learning processing, and FIG. 11B illustrates a configuration relating to estimation processing. Here, estimation processing will be described after describing learning processing. In FIG. 11A, the assistance system 400 includes a controller 441, a detected information inputter 452, and an outputter 454. The controller 441 includes an acquirer 460, a determiner 462, and a processor 464. The acquirer 460 includes an utterance content acquirer 470 and a speaker acquirer 472, and the processor 464 includes a learning unit 480, supervision data 482, and an utterance behavior model 484. Furthermore, the microphone 350 and camera 352 are connected to the detected information inputter 452, and the reporting unit 354 is connected to the outputter 454.

The assistance system 400 executes processing relating to an utterance behavior model for utterances. Speech from the microphone 350 and images from the camera 352 are input to the detected information inputter 452 as detected information. It may be said that detected information for utterances is input. The detected information inputter 452 outputs the speech, in the detected information, from the microphone 350 to the utterance content acquirer 470 and the processor 464, and outputs the images from the camera 352 to the speaker acquirer 472. Here, the detected information inputter 452 may also output the images from the camera 352 to the utterance content acquirer 470.

The utterance content acquirer 470 in the acquirer 460 receives the speech from the detected information inputter 452. The utterance content acquirer 470 recognizes utterance content by executing speech recognition processing and natural language processing. Well-known techniques may be used for such processing. The utterance content acquirer 470 outputs utterance content to the determiner 462. The speaker acquirer 472 receives the images from the detected information inputter 452. The speaker acquirer 472 stores images (hereinafter called "reference images") in which the faces of utterance speakers, which constitute pre-processing targets, are shown. Reference images for each of the plurality of utterance speakers may also be stored. The speaker acquirer 472 recognizes whether or not the speaker included in a received image is the same as a speaker included in a reference image by subjecting the received image to image recognition processing. The speaker acquirer 472 outputs the recognition result, that is, whether or not the speakers are the same, to the determiner 462. This corresponds to outputting utterance speaker information to the determiner 462. Thus, the acquirer 460 acquires utterance content and/or an utterance speaker as one or more information items affecting the accuracy of the behavior model.

The determiner 462 receives utterance content from the utterance content acquirer 470 and speaker information from the speaker acquirer 472. The determiner 462 makes a determination of whether or not to execute processing on the basis of the utterance content and/or the speaker information. For the processing, learning is illustrated in FIG. 11A and estimation is illustrated in FIG. 11B. Here, the processing of the determiner 462, from the first determination processing to the third determination processing, will be described in that order.

1. First Determination Processing

In first determination processing, utterance content and speaker information are used. The determiner 462 pre-stores one or more keywords to be included in planned utterance content. The determiner 462 determines whether or not the keywords are included in utterance content. If the keywords are not included in the utterance content, that is, if the utterance content is unplanned, the determiner 462 makes a determination to not execute processing. If the keywords are included in the utterance content, that is, if the utterance content is planned, the determiner 462 confirms the speaker information. If the speaker information indicates that the speaker included in the image differs from the speaker included in a reference image, that is, if the speaker of the utterance is unplanned, the determiner 462 makes a determination to not execute processing. On the other hand, if the speaker information indicates that the speaker included in the image is the same as a speaker included in a reference image, that is, if the speaker of the utterance is planned, the determiner 462 makes a determination to execute processing.

2. Second Determination Processing

In second determination processing, utterance content is used. The determiner 462 executes processing as per the first determination processing and makes a determination to not execute processing if the utterance content is unplanned. On the other hand, the determiner 462 makes a determination to execute processing if the utterance content is planned.

3. Third Determination Processing

In third determination processing, speaker information is used. The determiner 462 executes processing as per the first determination processing and makes a determination to not execute processing if the speaker of the utterance is unplanned. On the other hand, the determiner 462 makes a determination to execute processing if the utterance speaker is planned.

Figure 12A:
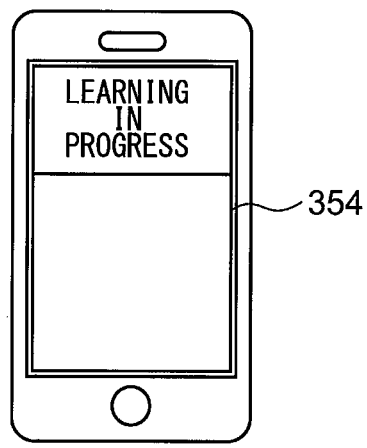
FIGS. 12A, 12B, 12C, 12D, 12E, and 12F are diagrams illustrating screens that are displayed by the reporting unit of the terminal device in FIG. 10.
Figure 12B:
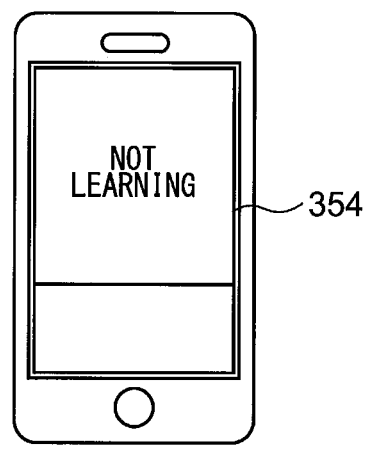
Figure 12C:
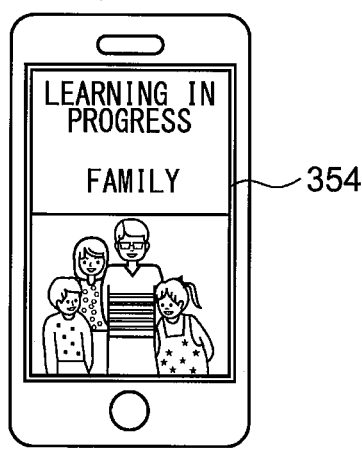
Figure 12D:
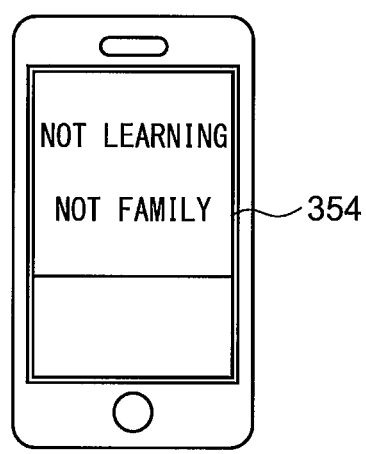
Figure 12E:
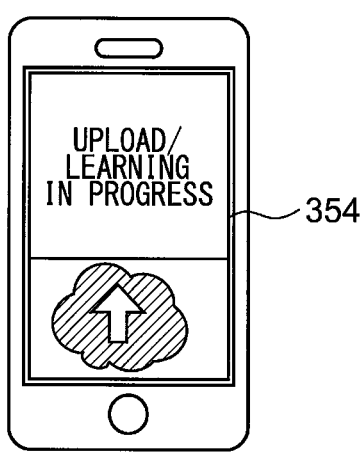
Figure 12F:
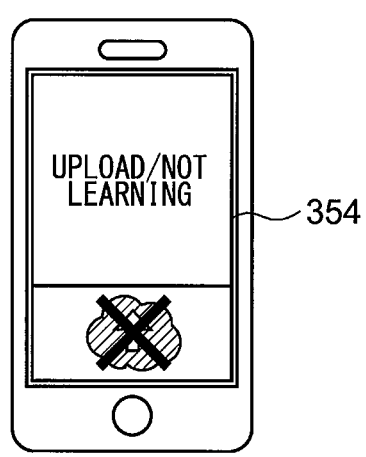

The determiner 462 outputs the determination result, that is, information relating to whether or not to execute learning, to the outputter 454 and the processor 464. The outputter 454 outputs information relating to whether or not to execute learning, to the reporting unit 354. The reporting unit 354 displays the information relating to whether or not to execute learning. FIGS. 12A to 12F illustrate screens which are displayed on the reporting unit 354 of the terminal device 310. FIG. 12A illustrates a screen in a case where a determination to execute learning has been made according to the second determination processing. For example, only "learning in progress" is indicated. FIG. 12B illustrates a screen in a case where a determination to not execute learning has been made according to the second determination processing. For example, "not learning" is indicated. FIG. 12C illustrates a screen in a case where a determination to execute learning has been made according to the first determination processing or the third determination processing. Here, an utterance speaker is configured as a family member. Hence, in addition to "learning in progress", it is also indicated that the reason for learning is that the utterance is by a "family member". Furthermore, which "family member" it is may also be indicated. FIG. 12D illustrates a screen in a case where a determination to not execute learning has been made according to the first determination processing or the third determination processing. Here, in addition to "not learning", it is also indicated that the reason learning is not taking place is that the utterance is by a guest, for example, a "non-family member". FIGS. 12E and 12F will be described subsequently. Let us return to FIG. 11A. The reporting unit 354 may also present the information regarding whether or not learning is executed via a loudspeaker as speech, instead of or in addition to the display illustrated in FIGS. 12A to 12D.

It is assumed that the processor 464 executes learning if the determiner 462 has made a determination to execute learning but does not execute learning if the determiner 462 has made a determination to not execute learning. A case where learning is executed will be described hereinbelow. The learning unit 480 receives speech from the detected information inputter 452. Like the utterance content acquirer 470, the learning unit 480 recognizes utterance content by subjecting the speech to speech recognition processing and natural language processing. Hence, the learning unit 480 receives the utterance content as input parameters 490. The learning unit 480 acquires a future variation amount which is associated with the utterance content as supervision data 482. The learning unit 480 executes processing on the basis of the input parameters 490, and more specifically learning processing to cause the utterance behavior model 484 to learn. To describe this in specific terms, the learning unit 480 adjusts the utterance behavior model 484 by means of the utterance content, which is the input parameters 490, and the supervision data 482. In other words, by inputting the input parameters 490 to a neural network, the learning unit 480 adjusts the weighting parameters and the like of the neural network such that the supervision data 482 is obtained as an output. As a result of this adjustment, the learning unit 480 causes the neural network to learn the relationship between the input parameters 490 and the supervision data 482. As a result, the utterance behavior model 484 is constructed.

Estimation processing will be described next using FIG. 11B. In FIG. 11B, the assistance system 400 includes a controller 441, a detected information inputter 452, and an outputter 454. The controller 441 includes an acquirer 460, a determiner 462, and a processor 464. The acquirer 460 includes an utterance content acquirer 470 and a speaker acquirer 472, and the processor 464 includes an utterance behavior model 484, an estimation unit 486, and an estimation value 488. Furthermore, the microphone 350 and camera 352 are connected to the detected information inputter 452, and the reporting unit 354 is connected to the outputter 454. The acquirer 460 and the determiner 462 execute processing as per FIG. 11A, and hence a description thereof is omitted here.

The determiner 462 outputs the determination result, that is, information relating to whether or not to execute estimation, to the outputter 454 and the processor 464. It is assumed that the processor 464 executes estimation if the determiner 462 has made a determination to execute estimation but does not execute estimation if the determiner 462 has made a determination to not execute estimation. A case where estimation is executed will be described hereinbelow. Hence, like the learning unit 480, the estimation unit 486 receives the utterance content as input data 492. Here, the utterance behavior model 484 recognizes content once an utterance is being made. For example, recognition is carried out in the order of "today" and then "today in Tokyo" in response to the foregoing "weather forecast for today in Tokyo". The estimation unit 486 executes processing on the basis of the input data 492, and more specifically estimation processing to estimate a future variation amount. To describe this in specific terms, the estimation unit 486 inputs the input data 492 to the utterance behavior model 484 and acquires the estimation value 488 from the utterance behavior model 484. The estimation value 488 is a future variation amount. For example, "weather forecast for today in Tokyo" is acquired as the estimation value 488 in response to "today". The processor 464 outputs response information on the basis of the future variation amount acquired in the estimation value 488.

Figure 13:
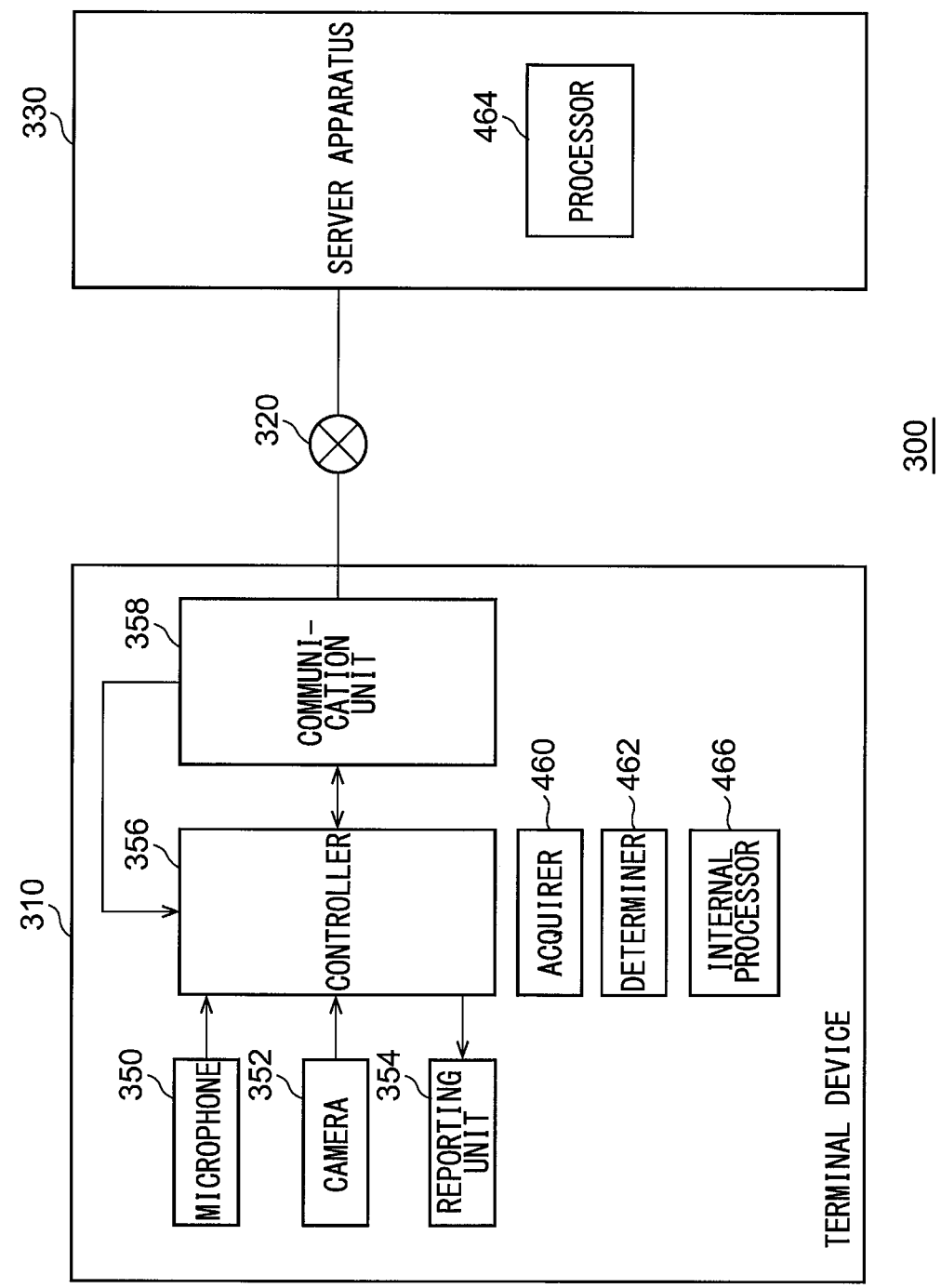
FIG. 13 is a diagram illustrating another configuration of the voice agent system according to the second embodiment.

The configuration of the voice agent system 300 is not limited to FIG. 10. FIG. 13 illustrates another configuration of the voice agent system 300. Thus far, only one processor 464 has been included in the voice agent system 300 or the assistance system 400. However, in the voice agent system 300 in FIG. 13, an internal processor 466 is included in the terminal device 310 and the processor 464 is included in the server apparatus 330. The processor 464 and the internal processor 466 are configured similarly. The acquirer 460 and the determiner 462 in FIGS. 11A and 11B are included in the controller 356 of the terminal device 310.

As described above, the determiner 462 pre-stores one or more keywords which are to be included in planned utterance content. In addition, the determiner 462 stores keywords which are divided into keywords to be processed by the processor 464 (hereinafter called "first keywords") and keywords to be processed by the internal processor 466 (hereinafter called "second keywords"). The first keywords and second keywords are different from each other. If a first keyword is included in utterance content, the determiner 462 selects the processor 464 when executing processing, and when a second keyword is included in utterance content, the determiner 462 selects the internal processor 466 when executing processing.

The acquirer 460 acquires the processing position of the utterance behavior model 484. The processing position here corresponds to either the processor 464 or the internal processor 466. The former is a case where the processing position of the utterance behavior model 484 is spaced apart from the utterance position via the network 320, and the latter is a case where the processing position of the utterance behavior model 484 is not spaced apart from the utterance position via the network 320. If the processing position of the utterance behavior model 484 is not spaced apart from the utterance position via the network 320, the determiner 462 makes a determination to not execute processing. This corresponds to not executing learning in a case where the internal processor 466 is used. Note that learning for which the internal processor 466 is used may be executed independently of learning for which the processor 464 is used.

The determiner 462 outputs the determination result, that is, information relating to whether or not to execute learning, to the outputter 454, the processor 464, and the internal processor 466. The outputter 454 outputs information relating to whether or not to execute learning, to the reporting unit 354. The reporting unit 354 displays the information relating to whether or not to execute learning. FIG. 12E illustrates a screen in a case where a determination to execute learning in the processor 464 has been made. "Upload/learning in progress" is indicated, for example. FIG. 12F illustrates a screen in a case where a determination to not execute learning has been made. "Upload/learning not being performed" is indicated, for example. The same screen as in FIG. 12A may also be shown if a determination to execute learning in the internal processor 466 has been made. Furthermore, the reporting unit 354 may also present the information regarding whether or not learning is executed via a loudspeaker as speech, instead of or in addition to the display illustrated in FIGS. 12E and 12F.

Figure 14:
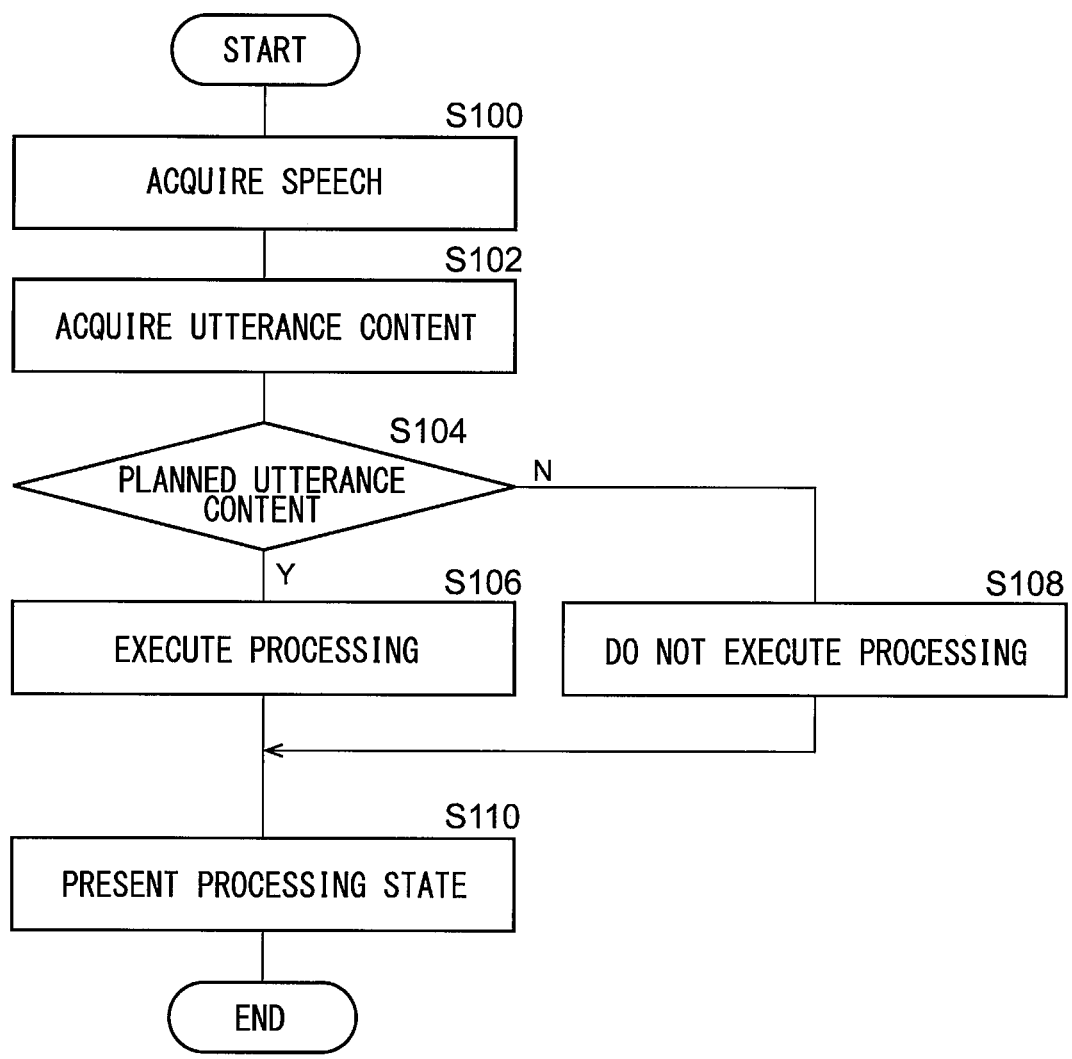
FIG. 14 is a flowchart illustrating a processing procedure by the assistance system of FIGS. 11A and 11B.

The functioning of the assistance system 400 according to the foregoing configuration will now be described. FIG. 14 is a flowchart illustrating a processing procedure by the assistance system 400. This corresponds to the procedure of the second determination processing. The detected information inputter 452 acquires speech (S100). The utterance content acquirer 470 acquires utterance content (S102). If the utterance content is planned utterance content (Y in S104), the determiner 462 makes a determination to execute processing (S106). If the utterance content is not planned utterance content (N in S104), the determiner 462 makes a determination to not execute processing (S108). The reporting unit 354 displays a processing state (S110).

Figure 15:
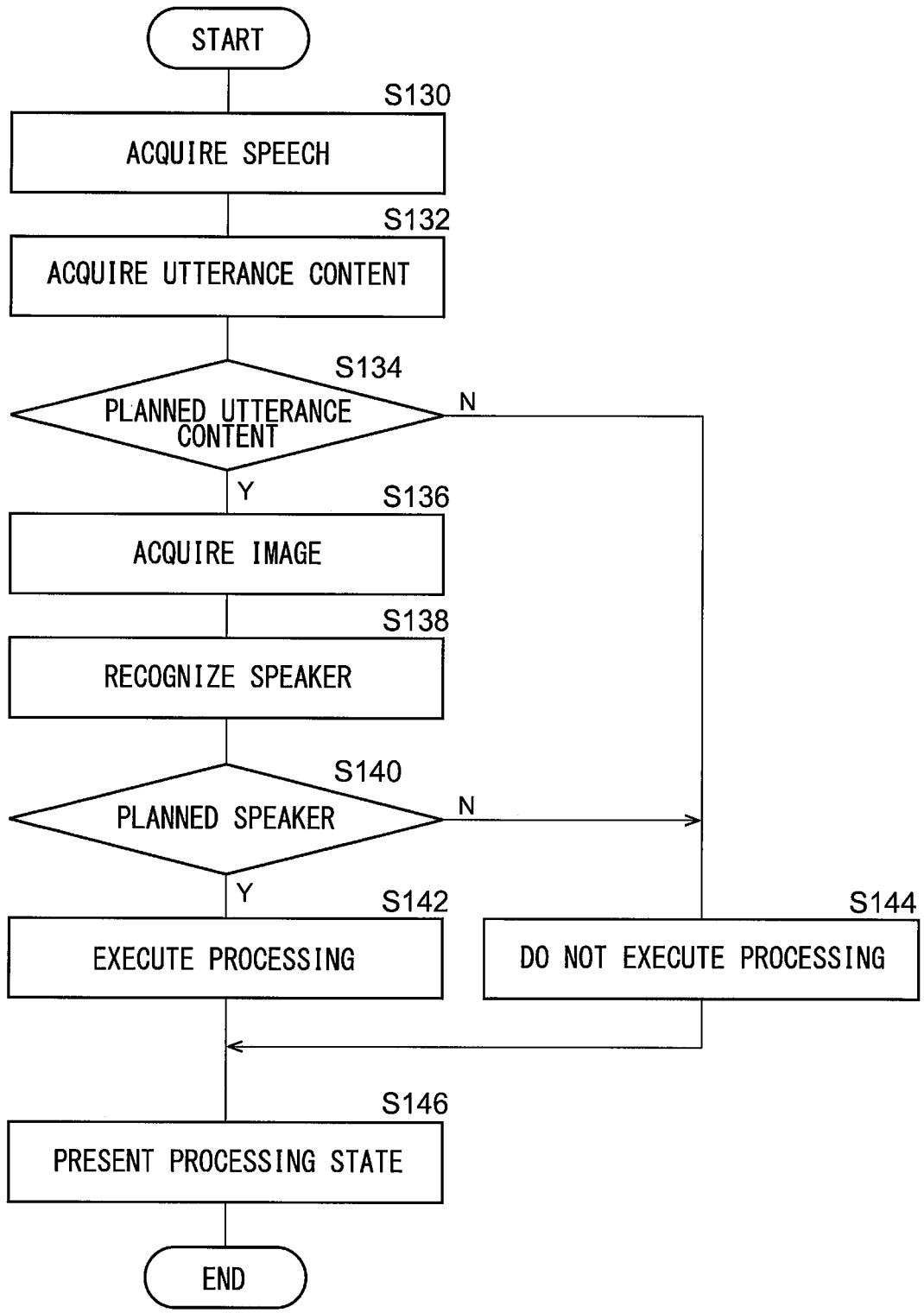
FIG. 15 is a flowchart illustrating another processing procedure by the assistance system of FIGS. 11A and 11B.

FIG. 15 is a flowchart illustrating another processing procedure by the assistance system 400. This corresponds to the procedure of the first determination processing. The detected information inputter 452 acquires speech (S130). The utterance content acquirer 470 acquires utterance content (S132). If the utterance content is planned utterance content (Y in S134), the detected information inputter 452 acquires images (S136). The speaker acquirer 472 performs speaker recognition (S138). If the speaker is a planned speaker (Y in S140), the determiner 462 makes a determination to execute processing (S142). If the utterance content is not planned utterance content (N in S134) or the speaker is not a planned speaker (N in S140), the determiner 462 makes a determination to not execute processing (S144). The reporting unit 354 displays a processing state (S146).

Figure 16:
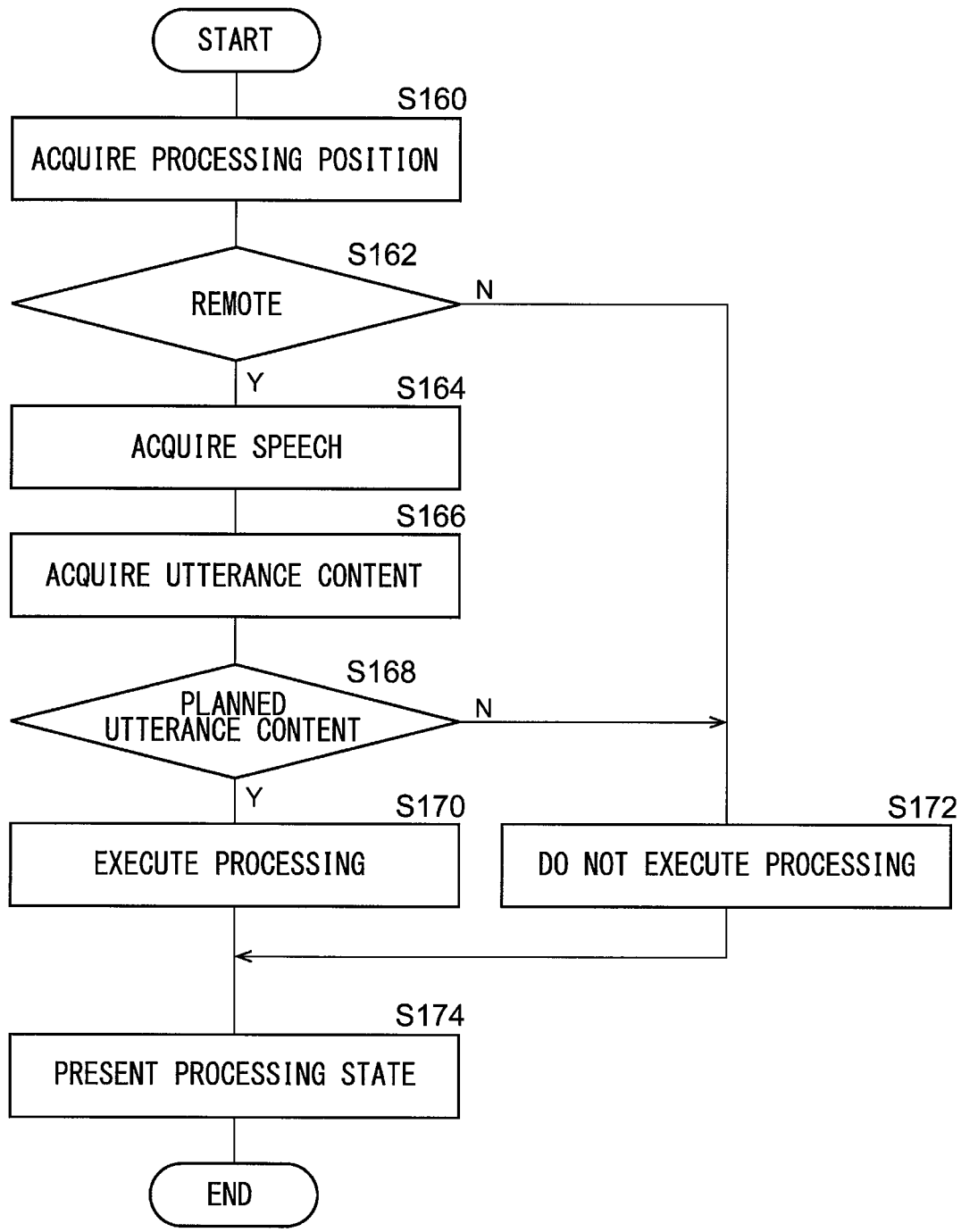
FIG. 16 is a flowchart illustrating a processing procedure by the voice agent system of FIG. 13.

FIG. 16 is a flowchart illustrating a processing procedure by the voice agent system 300. The acquirer 460 acquires the processing position (S160). If the processing position is remote (Y in S162), that is, if the processor 464 is used, the detected information inputter 452 acquires speech (S164). The utterance content acquirer 470 acquires utterance content (S166). If the utterance content is planned utterance content (Y in S168), the determiner 462 makes a determination to execute processing (S170). If the processing position is not remote (N in S162), that is, if the internal processor 466 is used, or if the utterance content is not planned utterance content (N in S168), the determiner 462 makes a determination to not execute processing (S172). The reporting unit 354 displays a processing state (S174).

According to this embodiment, because a determination of whether or not to execute processing is made on the basis of at least one of the utterance content, the utterance speaker, and position of the processor, execution of learning or estimation in states which are unsuitable for learning or estimation can be suppressed. In addition, because a determination to not execute processing is made if the utterance content is unplanned, it is possible to suppress the execution of learning or estimation in cases where using a behavior model is unsuitable due to the utterance content being unplanned. Furthermore, because a determination to not execute processing is made if the utterance speaker is unplanned, it is possible to suppress the execution of learning or estimation in cases where using a behavior model is unsuitable due to the utterance speaker being unplanned. In addition, because a determination to not execute processing is made if the position of the processor is not spaced apart from the utterance position via the network, it is possible to suppress the execution of learning or estimation in cases where using a behavior model is unsuitable due to the position of the processor being spaced apart from the utterance position via the network.

Third Embodiment

The third embodiment will be described next. Similarly to the foregoing, the third embodiment relates to an assistance system capable of switching between executing or not executing learning processing or estimation processing depending on the situation. In the third embodiment, the assistance system is used in a remote operation system. In the remote operation system, a smartphone, tablet-type terminal (hereinafter collectively called "terminal devices" as above), a server apparatus, and a device are connected via a network. The remote operation system causes a device spaced apart from an operator to function on the basis of an operation by the operator. For example, the operator operates a terminal device and the server apparatus controls a device according to the operation. In the remote operation system, there is a need to shorten the response duration until the device functions after an operation is performed by the operator. In order to shorten the response period, the content of the operation is estimated while the operation by the operator is underway, by employing an assistance system as the remote operation system. In this assistance system, learning processing or estimation processing for an operation behavior model is executed.

Here, an "operation behavior estimation engine" may be configured as per the "driving behavior estimation engine" or the "utterance behavior estimation engine". Furthermore, the "operation behavior model" is uniquely determined according to the operation behavior estimation engine. An operation behavior model in the case of DL is a learned neural network, an operation behavior model in the case of SVM is a learned prediction model, and an operation behavior model in the case of collaborative filtering is data obtained by associating operation data with response data for operation. An operation behavior model in the case of rules is data obtained by associating inputs with outputs.

On the basis of such definitions, when learning processing or estimation processing for an operation behavior model is executed in cases where the state is not a state suitable for operation, the accuracy of the learning or estimation is then low. Cases where the state is not a state suitable for operation include cases where an operation with content that has not been planned for learning or estimation is performed, cases where there is nobody in the vicinity of the device after an operation, and cases where someone is not happy with the results of an operation. In such cases, it is preferable to not perform learning or estimation. To deal with this situation, according to the present embodiment, at least one of the operation content, human presence, and the level of satisfaction with the operation is acquired, and a determination of whether or not to execute learning or estimation processing is made on the basis of the operation content, human presence, and/or the level of satisfaction with the operation. Learning or estimation is executed if a determination to execute processing has been made and learning or estimation is not executed if a determination to not execute processing has been made. The description hereinbelow will focus on the differences from the foregoing.

Figure 17:
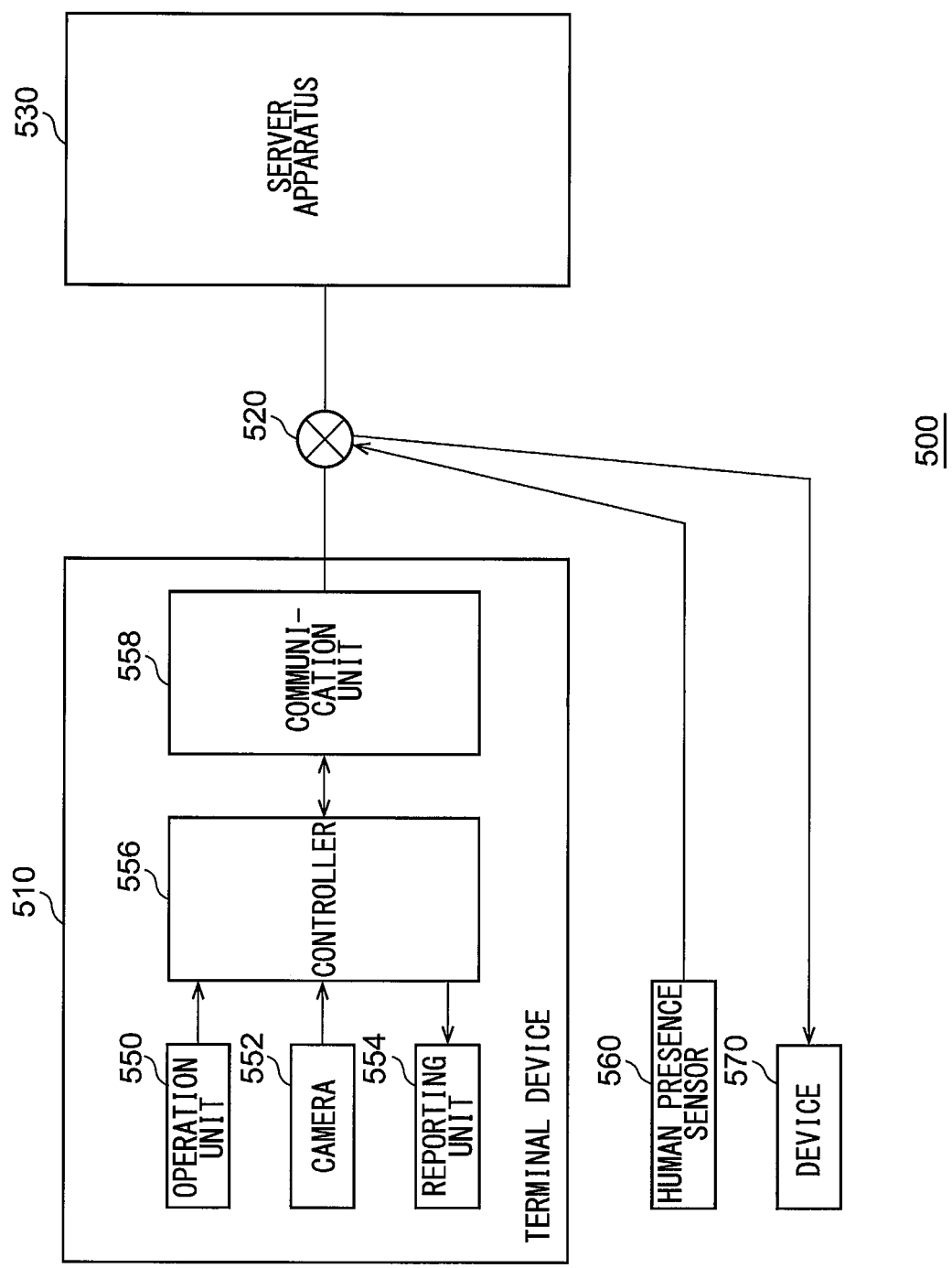
FIG. 17 is a diagram illustrating a configuration of a remote operation system according to a third embodiment.

FIG. 17 illustrates a configuration of a remote operation system 500. The remote operation system 500 includes a terminal device 510, a network 520, a server apparatus 530, a human presence sensor 560, and a device 570. The terminal device 510 includes an operation unit 550, a camera 552, a reporting unit 554, a controller 556, and a communication unit 558. The terminal device 510 is a smartphone or a tablet-type terminal, as mentioned earlier. The operation unit 550 is a touch panel, for example, and is an interface that receives operations by an operator with respect to the device 570. If the device 570 is an air-conditioner, the operation unit 550 receives power ON/power OFF operations, flow rate adjustment operations and temperature adjustment operations for an air-conditioner. The operation unit 550 outputs received operation content to the controller 556. The camera 552 is an imaging device capable of imaging the face of the operator. The images captured by the camera 552 may be still images or moving images. The camera 552 converts the images to a digital signal (hereinafter also called "images") and outputs the digital signal to the controller 556.

The controller 556 receives operation content from the operation unit 550 and receives images from the camera 552. The controller 556 outputs at least one of the foregoing received information to the communication unit 558. The communication unit 558 receives the information from the controller 556. The communication unit 558 is capable of executing wireless communication and is connected to the network 520 through wireless communication. The communication unit 558 transmits information to the server apparatus 530 via the network 520. Because a well-known technique may be used for the wireless communication performed by the communication unit 558, a description thereof is omitted here. The communication unit 558 may also execute wired communication. The reporting unit 554 is a display or a loudspeaker and, in accordance with an instruction from the controller 556, displays a screen on a display or presents speech via a loudspeaker.

The human presence sensor 560 is installed in the neighborhood of the device 570 and senses human presence. The neighborhood of the device 570 denotes the same room or space as the room where the device 570 is installed, for example. In addition, humans may include or may not include the operator. Because a well-known technique may be used for the human detection by the human presence sensor 560, a description thereof is omitted here. The human presence sensor 560 includes a communication function and transmits a sensing result to the server apparatus 530 via the network 520.

The server apparatus 530 receives the information from the terminal device 510 via the network 520. Furthermore, the server apparatus 530 receives the sensing result from the human presence sensor 560 via the network 520. The server apparatus 530 executes processing according to the operation content in the received information. For example, if the operation content is "turn on power of device 570" and "set temperature of device 570 at 28° C.", commands that correspond to these instructions, respectively, are transmitted to the device 570 via the network 520. The device 570 is connected to the network 520. An example of the device 570 is an air-conditioner, as mentioned above. The device 570 receives commands from the server apparatus 530 via the network 520. If commands that correspond to "turn on power of device 570" and "set temperature of device 570 at 28° C." are received, the device 570 turns on the power and sets the temperature at 28° C.

Figure 18A:
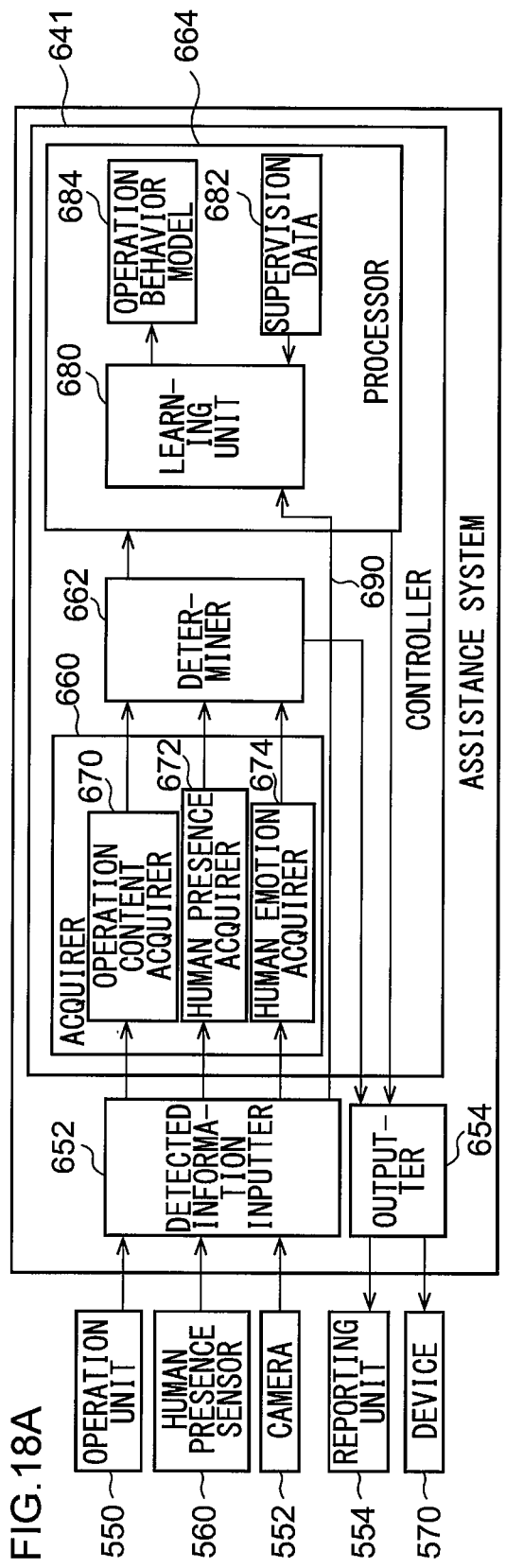
FIGS. 18A and 18B are diagrams illustrating configurations of an assistance system according to the third embodiment.
Figure 18B:
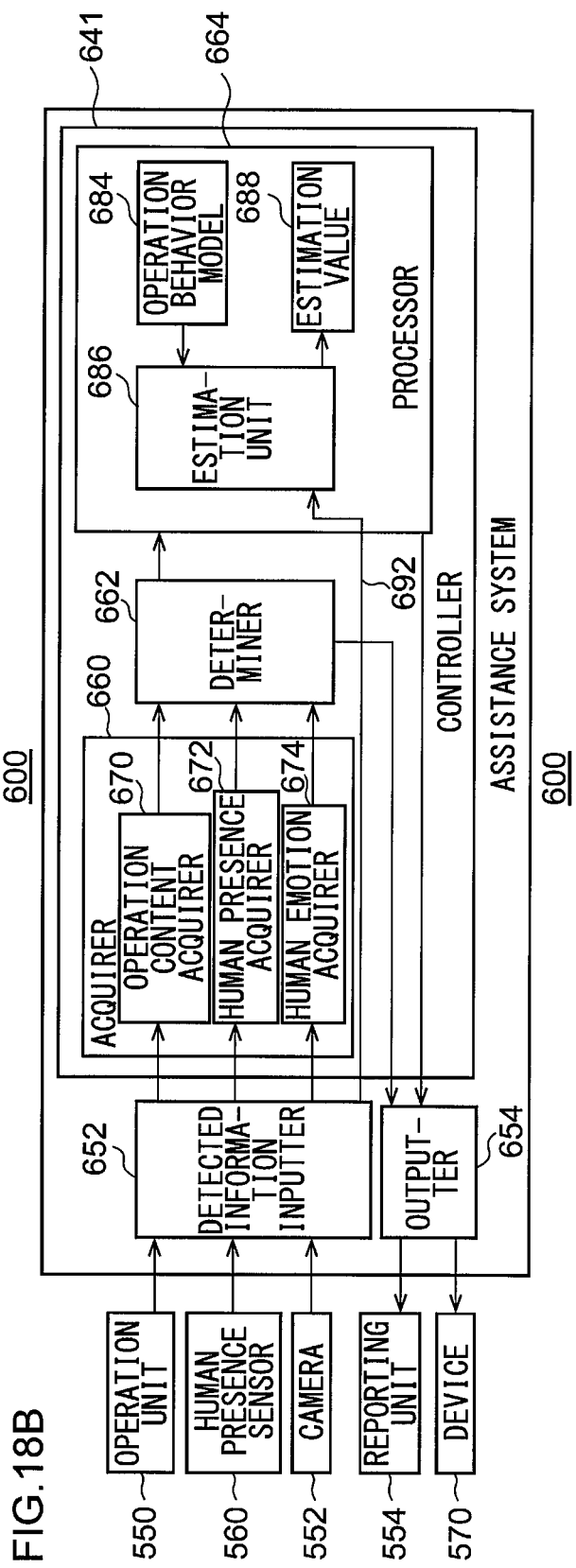

FIGS. 18A and 18B illustrate configurations of an assistance system 600. The assistance system 600 may be one device or may be a combination of a plurality of devices. If the assistance system 600 is one device, the assistance system 600 corresponds to the server apparatus 530 of FIG. 17. If the assistance system 600 is two or more devices, the assistance system 600 corresponds to a combination of the terminal device 510 and the server apparatus 530 in FIG. 17, for example. The assistance system 600 may include a device not illustrated in FIG. 17. FIG. 18A illustrates a configuration relating to learning processing, and FIG. 18B illustrates a configuration relating to estimation processing. Here, estimation processing will be described after describing learning processing. In FIG. 18A, the assistance system 600 includes a controller 641, a detected information inputter 652, and an outputter 654. The controller 641 includes an acquirer 660, a determiner 662, and a processor 664. The acquirer 660 includes an operation content acquirer 670, a human presence acquirer 672, and a human emotion acquirer 674, and the processor 664 includes a learning unit 680, supervision data 682, and an operation behavior model 684. Furthermore, the operation unit 550, the camera 552, and the human presence sensor 560 are connected to the detected information inputter 652, and the reporting unit 554 and the device 570 are connected to the outputter 654.

The assistance system 600 executes processing relating to the operation behavior model for the device 570. Operation content from the operation unit 550, sensing results from the human presence sensor 560, and images from the camera 552 are input to the detected information inputter 652 as detected information. It may be said that detected information for device 570 is input. The detected information inputter 652 outputs, from among the detected information, the operation content from the operation unit 550 to the operation content acquirer 670 and the processor 664, outputs the sensing result from the human presence sensor 560 to the human presence acquirer 672 and outputs the images from the camera 552 to the human emotion acquirer 674.

The operation content acquirer 670 in the acquirer 660 acquires the operation content of the device 570 by receiving the operation content from the detected information inputter 652. The operation content acquirer 670 outputs the operation content to the determiner 662. The human presence acquirer 672 receives the sensing result from the detected information inputter 652. The human presence acquirer 672 recognizes human presence in the neighborhood of the device 570 on the basis of the sensing result. The human presence acquirer 672 outputs the recognition result, that is, an indication of whether or not there is a human presence, to the determiner 662. The human emotion acquirer 674 receives images from the detected information inputter 652. The human emotion acquirer 674 recognizes the emotions of the operator shown in the images as operator emotions by performing image recognition processing on the images. Here, as operator emotions, it is recognized whether or not the operator is satisfied with the functioning of the device 570 that corresponds with an operation. Well-known techniques may be used in this processing and hence a description thereof is omitted here. The human emotion acquirer 674 outputs the recognition result, that is, an indication of whether or not the operator is satisfied, to the determiner 662.

Thus, the acquirer 660 acquires, as one or more information items affecting the accuracy of the behavior model, at least one information item from among the operation content of the device 570, human presence in the neighborhood of the device 570, and the emotions of the person operating the device 570.

The determiner 662 receives the operation content from the operation content acquirer 670, human presence information from the human presence acquirer 672, and human emotion information from the human emotion acquirer 674. The determiner 662 makes a determination regarding whether or not to execute processing on the basis of at least one of the operation content, the human presence information, and the human emotion information. For the processing, learning is illustrated in FIG. 18A and estimation is illustrated in FIG. 18B. Here, the processing of the determiner 662, from the first determination processing to the fifth determination processing, will be described in that order.

1. First Determination Processing

In first determination processing, operation content and human presence information are used. The determiner 662 pre-stores planned operation content. The determiner 662 determines whether or not the acquired operation content is included in planned operation content. If the operation content of device 570 is unplanned, the determiner 662 makes a determination to not execute processing. If the operation content of device 570 is planned, the determiner 662 confirms human presence information. If it is indicated that there is no human presence after the operation, the determiner 662 makes a determination to not execute processing. On the other hand, if it is indicated that there is human presence after the operation, the determiner 662 makes a determination to execute processing.

2. Second Determination Processing

In second determination processing, operation content and human emotion information are used. The determiner 662 determines whether or not the acquired operation content is included in planned operation content. If the operation content of device 570 is unplanned, the determiner 662 makes a determination to not execute processing. If the operation content of device 570 is planned, the determiner 662 confirms human emotion information. If the human emotion is dissatisfaction, the determiner 662 makes a determination to not execute processing. On the other hand, if the human emotion is satisfaction, the determiner 662 makes a determination to execute processing.

3. Third Determination Processing

In third determination processing, operation content is used. The determiner 662 executes processing as per the first determination processing and makes a determination to not execute processing if the operation content is unplanned. On the other hand, the determiner 662 makes a determination to execute processing if the operation content is planned.

4. Fourth Determination Processing

In fourth determination processing, human presence information is used. The determiner 662 executes processing as per the first determination processing and makes a determination to not execute processing if there is no human presence after the operation. On the other hand, the determiner 662 makes a determination to execute processing if there is human presence after the operation.

5. Fifth Determination Processing

In fifth determination processing, human emotion information is used. The determiner 662 executes processing as per the second determination processing and makes a determination to not execute processing if the human emotion is dissatisfaction. On the other hand, the determiner 662 makes a determination to execute processing if the human emotion is satisfaction.

Unlike the first determination processing to the fifth determination processing, the determiner 662 may determine whether or not to execute processing by combining operation content, human presence information, and human emotion information. The determiner 662 outputs the determination result, that is, information relating to whether or not to execute learning, to the outputter 654 and the processor 664. The outputter 654 outputs information relating to whether or not to execute learning, to the reporting unit 554. The reporting unit 554 displays the information relating to whether or not to execute learning.

It is assumed that the processor 664 executes learning if the determiner 662 has made a determination to execute learning but does not execute learning if the determiner 662 has made a determination to not execute learning. A case where learning is executed will be described hereinbelow. The learning unit 680 receives operation content from the detected information inputter 652. Hence, the learning unit 680 receives the operation content as input parameters 690. The learning unit 680 acquires a future variation amount which is associated with the operation content as supervision data 682. The learning unit 680 executes processing on the basis of the input parameters 690, and more specifically learning processing to cause the operation behavior model 684 to learn. To describe this in specific terms, the learning unit 680 adjusts the operation behavior model 684 by means of the operation content, which is the input parameters 690, and the supervision data 682. In other words, by inputting the input parameters 690 to a neural network, the learning unit 680 adjusts the weighting parameters and the like of the neural network such that the supervision data 682 is obtained as an output. As a result of this adjustment, the learning unit 680 causes the neural network to learn the relationship between the input parameters 690 and the supervision data 682. As a result, the operation behavior model 684 is constructed.

Estimation processing will be described next using FIG. 18B. In FIG. 18B, the assistance system 600 includes a controller 641, a detected information inputter 652, and an outputter 654. The controller 641 includes an acquirer 660, a determiner 662, and a processor 664. The acquirer 660 includes an operation content acquirer 670, a human presence acquirer 672, and a human emotion acquirer 674, and the processor 664 includes an operation behavior model 684, an estimation unit 686, and an estimation value 688. Furthermore, the operation unit 550, the camera 552, and the human presence sensor 560 are connected to the detected information inputter 652, and the reporting unit 554 and the device 570 are connected to the outputter 654. The acquirer 660 and the determiner 662 execute processing as per FIG. 18A, and hence a description thereof is omitted here.

The determiner 662 outputs the determination result, that is, information relating to whether or not to execute estimation, to the outputter 654 and the processor 664. It is assumed that the processor 664 executes estimation if the determiner 662 has made a determination to execute estimation but does not execute estimation if the determiner 662 has made a determination to not execute estimation. A case where estimation is executed will be described hereinbelow.

Like the learning unit 680, the estimation unit 686 receives the operation content as input data 692. Here, the operation behavior model 684 recognizes operation content once operation is underway. For example, where the foregoing "turn on power of device 570" and "set temperature of device 570 at 28° C." are concerned, "set temperature of device 570 at 28° C." is recognized after "turn on power of device 570" is recognized. The estimation unit 686 executes processing on the basis of the input data 692, and more specifically estimation processing to estimate a future variation amount. To describe this in specific terms, the estimation unit 686 inputs the input data 692 to the operation behavior model 684 and acquires the estimation value 688 from the operation behavior model 684. The estimation value 688 is a future variation amount. For example, where "turn on power of device 570" is concerned, "turn on power of device 570" and "set temperature of device 570 at 28° C." are acquired as the estimation value 688. The processor 664 outputs a command together with the future variation amount acquired in the estimation value 688.

Figure 19:
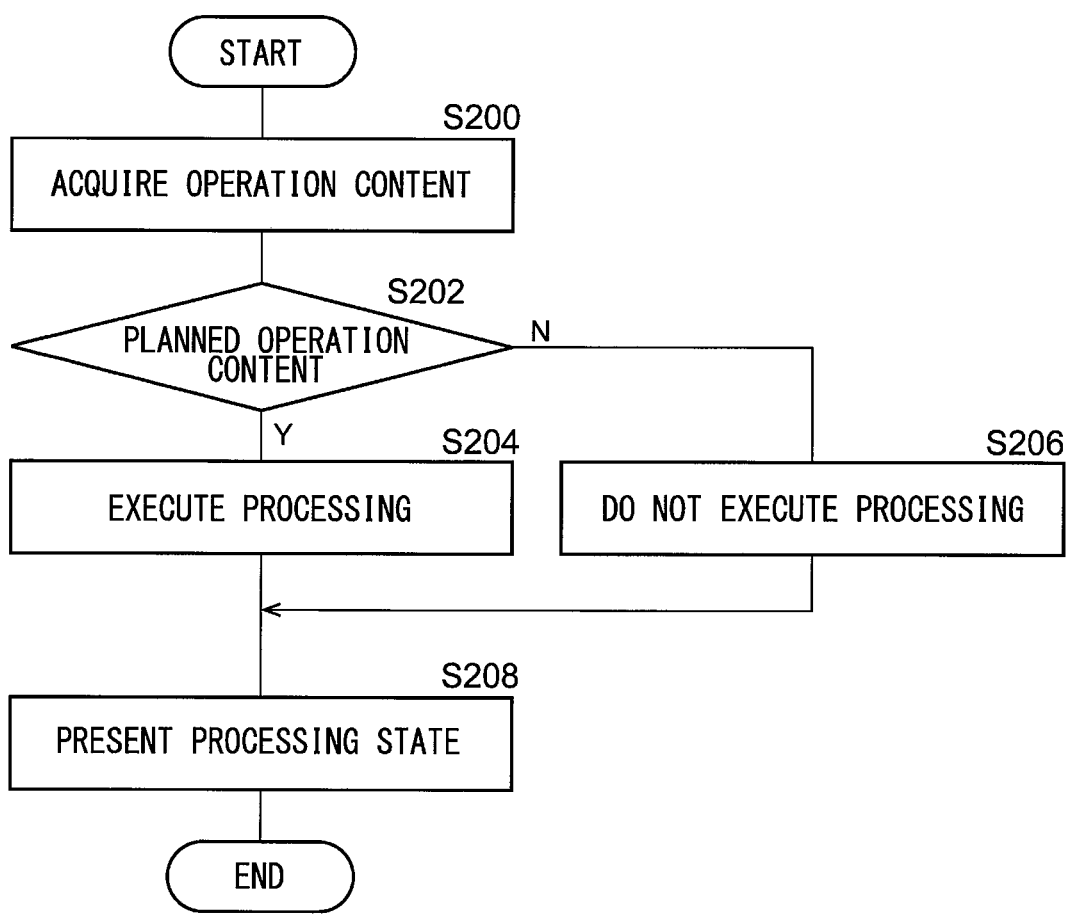
FIG. 19 is a flowchart illustrating a processing procedure by the assistance system of FIGS. 18A and 18B.

The functioning of the assistance system 600 according to the foregoing configuration will now be described. FIG. 19 is a flowchart illustrating a processing procedure by the assistance system 600. This corresponds to the procedure of the third determination processing. The operation content acquirer 670 acquires operation content (S200). If the operation content is planned operation content (Y in S202), the determiner 662 makes a determination to execute processing (S204). If the operation content is not planned operation content (N in S202), the determiner 662 makes a determination to not execute processing (S206). The reporting unit 554 displays the processing state (S208).

Figure 20:
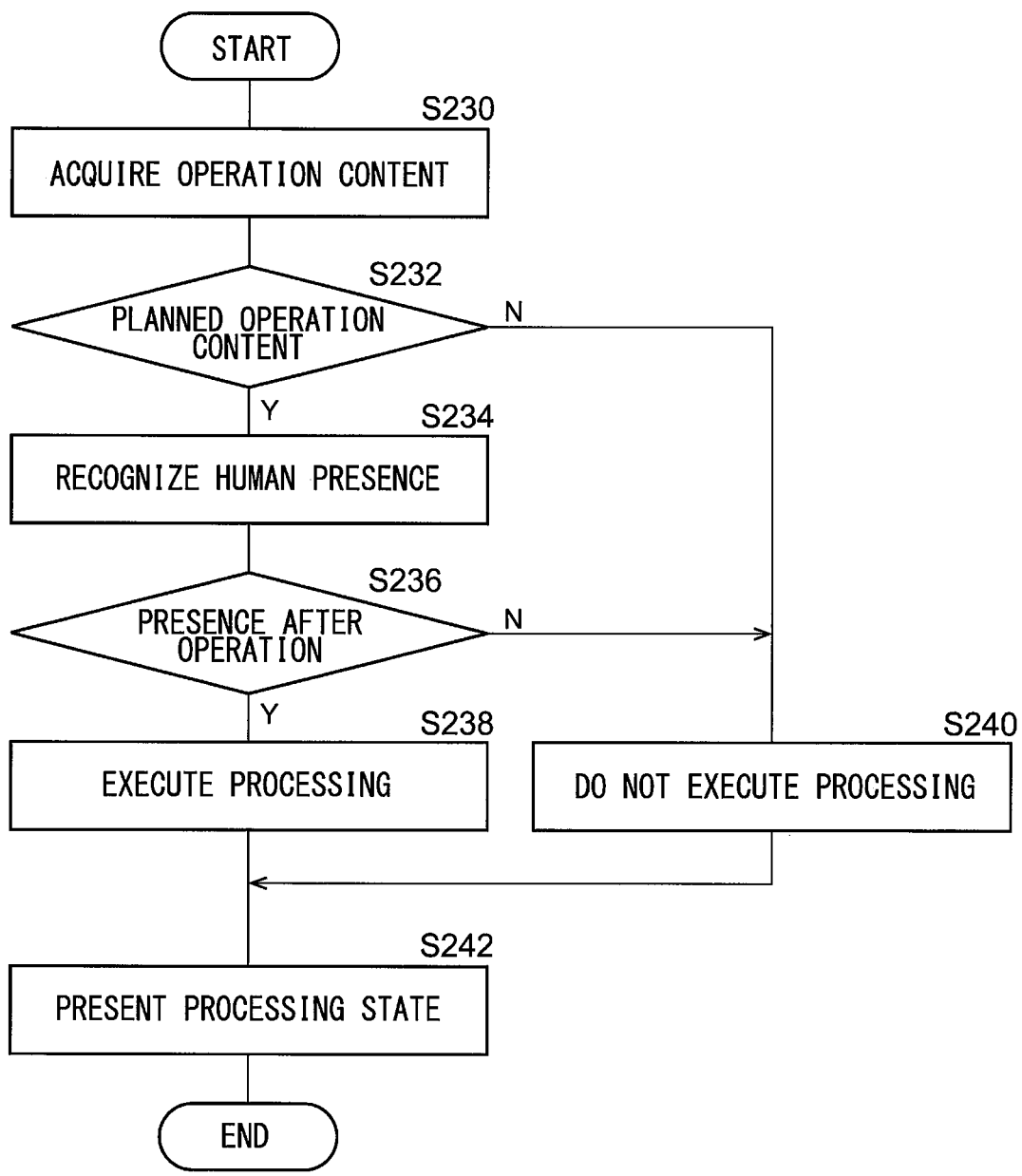
FIG. 20 is a flowchart illustrating another processing procedure by the assistance system of FIGS. 18A and 18B.

FIG. 20 is a flowchart illustrating another processing procedure by the assistance system 600. This corresponds to the procedure of the first determination processing. The operation content acquirer 670 acquires operation content (S230). If the operation content is planned operation content (Y in S232), the human presence acquirer 672 performs human presence recognition (S234). If there is human presence after the operation (Y in S236), the determiner 662 makes a determination to execute processing (S238). If the operation content is not planned operation content (N in S232) or there is no human presence after the operation (N in S236), the determiner 662 makes a determination to not execute processing (S240). The reporting unit 554 displays the processing state (S242).

Figure 21:
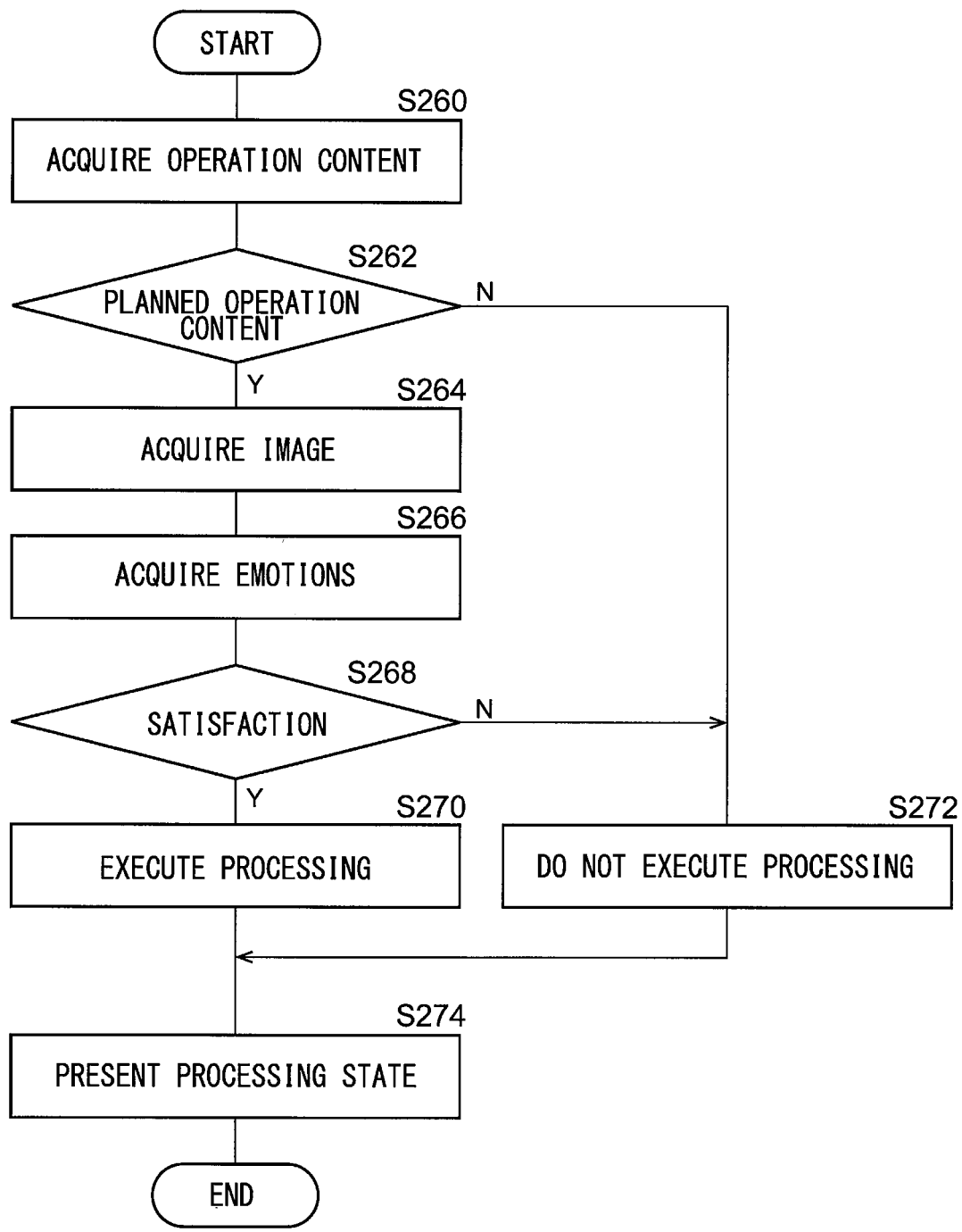
FIG. 21 is a flowchart illustrating yet another processing procedure by the assistance system of FIGS. 18A and 18B.

FIG. 21 is a flowchart illustrating yet another processing procedure by the assistance system 600. This corresponds to the procedure of the second determination processing. The operation content acquirer 670 acquires operation content (S260). If the operation content is planned operation content (Y in S262), the detected information inputter 652 acquires images (S264). The human emotion acquirer 674 acquires human emotions (S266). If the person is satisfied (Y in S268), the determiner 662 makes a determination to execute processing (S270). If the operation content is not planned operation content (N in S262) or the person is not satisfied (N in S268), the determiner 662 makes a determination to not execute processing (S272). The reporting unit 554 displays the processing state (S274).

According to this embodiment, because a determination of whether or not to execute processing is made on the basis of at least one of the operation content of the device, human presence in the neighborhood of the device, and the emotions of the person operating the device, execution of learning or estimation in states which are unsuitable for learning or estimation can be suppressed. In addition, because a determination to not execute processing is made if the operation content of the device is unplanned, it is possible to suppress the execution of learning or estimation in cases where using a behavior model is unsuitable due to the operation content of the device being unplanned. Furthermore, because a determination to not execute processing is made if there is no human presence, it is possible to suppress the execution of learning or estimation in cases where using a behavior model is unsuitable due to there being no human presence. Furthermore, because a determination to not execute processing is made if the human emotion is dissatisfaction, it is possible to suppress the execution of learning or estimation in cases where using a behavior model is unsuitable due to the human emotion being dissatisfaction.

The embodiment of the present disclosure has been described in detail hereinabove with reference to the drawings, but the functions of the foregoing devices and respective processors may also be realized by a computer program. A computer that realizes the foregoing functions by means of a program includes input devices such as a keyboard and a mouse, or a touchpad, output devices such as a display and a loudspeaker, a central processing unit (CPU), storage devices such as a ROM, a RAM, a hard disk drive or a solid state drive (SSD), a reader that reads information from a recording medium such as a DVD-ROM (Digital Video Disk Read Only Memory) or a USB memory, and a network card that performs communication via a network, and the like, and each part is connected by means of a bus.

Furthermore, the reader reads the program from the recording medium whereon the program is recorded and stores the program in a storage device. Alternatively, the network card communicates with the server apparatus connected to the network and stores, on the storage device, a program for realizing the respective device functions which is downloaded from the server apparatus. Further, the respective device functions are realized as a result of the CPU copying the program stored in the storage device to the RAM and sequentially reading and executing instructions contained in the program from the RAM.

An overview of one embodiment of the present disclosure is as follows. The assistance system according to one embodiment of the present disclosure is an assistance system that executes processing relating to a behavior model, including: a detected information inputter to which detected information is input; an acquirer structured to acquire one or more information items affecting the accuracy of the behavior model on the basis of the detected information input to the detected information inputter; a determiner structured to make a determination of whether or not to execute processing on the basis of the one or more information items acquired by the acquirer; and a processor structured to execute the processing relating to the behavior model if the determiner has made a determination to execute processing. It is assumed that the processor does not execute the processing relating to the behavior model if the determiner has made a determination to not execute processing.

According to this embodiment, because a determination of whether or not to execute processing is made on the basis of one or more information items affecting the accuracy of the behavior model, the execution of learning or estimation in states which are unsuitable for learning or estimation can be suppressed.

This assistance system executes processing relating to a behavior model of a vehicle and detected information from the vehicle is input to the detected information inputter, and the acquirer may derive, as one or more information items affecting the accuracy of the behavior model, at least one information item from among the travel difficulty level of the vehicle, the wakefulness level of the driver, and the driving proficiency level of the driver. In this case, because a determination of whether or not to execute processing is made on the basis of at least one of the travel difficulty level, the wakefulness level, and the driving proficiency level, execution of learning or estimation in states which are unsuitable for learning or estimation can be suppressed.

The acquirer may derive the travel difficulty level of the vehicle, and the determiner may make a determination to not execute processing if the travel difficulty level derived by the acquirer is above a threshold value. In this case, because a determination to not execute processing is made if the travel difficulty level is high, it is possible to suppress the execution of learning or estimation in cases where using a behavior model is unsuitable due to the travel difficulty level being high.

The acquirer may derive the wakefulness level of the driver, and the determiner may make a determination to not execute processing if the wakefulness level derived by the acquirer is below a threshold value. In this case, because a determination to not execute processing is made if the wakefulness level is low, it is possible to suppress the execution of learning or estimation in cases where using a behavior model is unsuitable due to the wakefulness level being low.

The acquirer may derive the driving proficiency level of the driver, and the determiner may make a determination to not execute processing if the driving proficiency level derived by the acquirer is below a threshold value. In this case, because a determination to not execute processing is made if the driving proficiency level is low, it is possible to suppress the execution of learning or estimation in cases where using a behavior model is unsuitable due to the driving proficiency level being low.

The acquirer may derive two or more information items from among the travel difficulty level of the vehicle, the wakefulness level of the driver, and the driving proficiency level of the driver, and the determiner may determine whether or not to execute processing on the basis of a combination of the two or more information items derived by the acquirer. In this case, because a determination of whether or not to execute processing is made on the basis of a combination of two or more information items from among the travel difficulty level, the wakefulness level, and the driving proficiency level, the determination accuracy can be improved.

The acquirer may derive the travel difficulty level of the vehicle and the wakefulness level of the driver, and in a case where the travel difficulty level is equal to or less than a first threshold value, the determiner may make a determination to not execute processing if the wakefulness level is below a second threshold value or the wakefulness level is above a third threshold value (the third threshold value>the second threshold value). In this case, because a determination to not execute processing is made on the basis of a combination of the travel difficulty level and the wakefulness level, the determination accuracy can be improved.

The acquirer may derive the travel difficulty level of the vehicle and the wakefulness level of the driver, and in a case where the travel difficulty level is above a first threshold value, the determiner may make a determination to not execute processing if the wakefulness level is below a fourth threshold value. In this case, because a determination to not execute processing is made on the basis of a combination of the travel difficulty level and the wakefulness level, the determination accuracy can be improved.

The acquirer may derive the wakefulness level of the driver and the driving proficiency level of the driver, and the determiner may set a threshold value lower as the driving proficiency level increases and may make a determination to not execute processing if the wakefulness level is below the threshold value. In this case, because a determination to not execute processing is made on the basis of a combination of the wakefulness level and the driving proficiency level, the determination accuracy can be improved.

The acquirer may derive the travel difficulty level of the vehicle and the driving proficiency level of the driver, and the determiner may set a threshold value higher as the driving proficiency level increases and may make a determination to not execute processing if the travel difficulty level is above the threshold value. In this case, because a determination to not execute processing is made on the basis of a combination of the travel difficulty level and the driving proficiency level, the determination accuracy can be improved.

This assistance system executes processing relating to a behavior model for an utterance and detected information for the utterance is input to the detected information inputter, and the acquirer may acquire, as one or more information items affecting the accuracy of the behavior model, at least one information item from among content of the utterance, a speaker of the utterance, and a processing position of the behavior model. In this case, because a determination of whether or not to execute processing is made on the basis of at least one of the utterance content, the utterance speaker, and the processing position of the behavior model, execution of learning or estimation in states which are unsuitable for learning or estimation can be suppressed.

The acquirer may acquire utterance content, and the determiner may make a determination to not execute processing if the utterance content acquired by the acquirer is unplanned. In this case, because a determination to not execute processing is made if the utterance content is unplanned, it is possible to suppress the execution of learning or estimation in cases where using a behavior model is unsuitable due to the utterance content being unplanned.

The acquirer may recognize a speaker of the utterance, and the determiner may make a determination to not execute processing if the utterance speaker recognized by the acquirer is unplanned. In this case, because a determination to not execute processing is made if the utterance speaker is unplanned, it is possible to suppress the execution of learning or estimation in cases where using a behavior model is unsuitable due to the utterance speaker being unplanned.

The acquirer may acquire the processing position of the behavior model, and the determiner may make a determination to not execute processing if the processing position of the behavior model acquired by the acquirer is not spaced apart from the utterance position via the network. In this case, because a determination to not execute processing is made if the processing position of the behavior model is not spaced apart from the utterance position via the network, it is possible to suppress the execution of learning or estimation in cases where using a behavior model is unsuitable due to the processing position of the behavior model being spaced apart from the utterance position via the network.

This assistance system executes processing relating to a behavior model for a device and detected information for the device is input to the detected information inputter, and the acquirer may acquire, as one or more information items affecting the accuracy of the behavior model, at least one information item from among operation content of the device, human presence in the neighborhood of the device, and the emotions of the person operating the device. In this case, because a determination of whether or not to execute processing is made on the basis of at least one information item from among the operation content of the device, human presence in the neighborhood of the device, and the emotions of the person operating the device, execution of learning or estimation in states which are unsuitable for learning or estimation can be suppressed.

The acquirer may acquire the operation content of the device, and the determiner may make a determination to not execute processing if the operation content of the device acquired by the acquirer is unplanned. In this case, because a determination to not execute processing is made if the operation content of the device is unplanned, it is possible to suppress the execution of learning or estimation in cases where using a behavior model is unsuitable due to the operation content of the device being unplanned.

The acquirer may recognize human presence in the neighborhood of the device, and the determiner may make a determination to not execute processing if the human presence recognition performed by the acquirer indicates no human presence. In this case, because a determination to not execute processing is made if there is no human presence, it is possible to suppress the execution of learning or estimation in cases where using a behavior model is unsuitable due to there being no human presence.

The acquirer may acquire the emotions of the person operating the device, and the determiner may make a determination to not execute processing if the human emotion acquired by the acquirer is dissatisfaction. In this case, because a determination to not execute processing is made if the human emotion is dissatisfaction, it is possible to suppress the execution of learning or estimation in cases where using a behavior model is unsuitable due to the human emotion being dissatisfaction.

The processing of the processor is learning processing that causes a behavior model to learn, and the processor may construct the behavior model according to input parameters. In this case, because a determination is made of whether or not to execute learning, the execution of learning in states which are unsuitable for learning can be suppressed.

The processing of the processor is estimation processing that estimates behavior, and the processor may input input data to the behavior model and may acquire an output from the behavior model as behavior. In this case, because a determination is made of whether or not to execute estimation, the execution of estimation in states which are unsuitable for estimation can be suppressed.

The processing of the processor is learning processing that causes a behavior model to learn and estimation processing that estimates behavior, and the processor may construct a behavior model by means of input parameters when executing learning processing and input input data to the behavior model and acquire an output from the behavior model as behavior when executing estimation processing. In this case, because a determination is made of whether or not to execute learning and estimation, the execution of learning and estimation in states which are unsuitable for learning and estimation can be suppressed.

Another embodiment of the present disclosure is an assistance device. This device is an assistance device that executes processing relating to a behavior model, including: a detected information inputter to which detected information is input; an acquirer structured to acquire one or more information items affecting the accuracy of the behavior model, on the basis of the detected information input to the detected information inputter; a determiner structured to determine, on the basis of the one or more information items acquired by the acquirer, whether or not to execute processing; and a processor structured to execute the processing relating to the behavior model if the determiner has made a determination to execute processing. It is assumed that the processor does not execute the processing relating to the behavior model if the determiner has made a determination to not execute processing.

According to this embodiment, because a determination of whether or not to execute processing is made on the basis of one or more information items affecting the accuracy of the behavior model, the execution of learning or estimation in states which are unsuitable for learning or estimation can be suppressed.

Yet another embodiment of the present disclosure is an assistance method. This method is an assistance method that executes processing relating to a behavior model, including the steps of: inputting detected information; acquiring, on the basis of the detected information thus input, one or more information items affecting the accuracy of the behavior model; determining, on the basis of the one or more acquired information items, whether or not to execute processing; executing the processing relating to the behavior model if a determination to execute processing has been made; and not executing the processing relating to the behavior model if a determination to not execute processing has been made.

The present disclosure has been described on the basis of embodiments hereinabove. These embodiments are illustrative, and it is understood by a person skilled in the art that a variety of modification examples involving combinations of the respective constituent elements and the respective processing processes are feasible and that such modification examples lie within the scope of the present disclosure.

In the first to third embodiments, the processor 64 includes the learning unit 80 or the estimation unit 86. However, the present disclosure is not limited to this configuration, rather, the processor 64 may include the learning unit 80 in addition to the estimation unit 86. In this case, the processor 64 executes learning processing and estimation processing. The processor 64 may be the processor 464 and the processor 664, the learning unit 80 may be the learning unit 480 and the learning unit 680, and the estimation unit 86 may be the estimation unit 486 and the estimation unit 686. According to this modification example, because a determination of whether or not to execute learning and estimation is made, the execution of learning and estimation in a situation unsuitable for learning and estimation can be suppressed.

According to the first embodiment, learning and estimation of the driving behavior model 84 are executed. Behavior may be driving behavior or non-driving behavior. For example, non-driving behavior is operations of vehicle-mounted devices and secondary tasks permitted at a self-driving level 3 (driving is defined as the primary task and it will be determined hereinafter what is permitted as a secondary task, such as behaviors in which non-driving text is read). When behavior other than driving behavior is estimated, time series data such as a temperature adjustment amount, a volume level adjustment amount, and an air-conditioner operation amount, which are acquired from a vehicle-mounted device, is used in the processing. For example, in attempting to adjust the volume level when driver drowsiness is high, the volume level may be adjusted unexpectedly high. By not performing learning in this cases, the learning of unintentional, erroneous operations can be suppressed. Applying this to behavior other than driving behavior, learning of non-driving behavior is suppressed in situations where performing the non-driving behavior would appear to not be possible in the way intended, as in the case of driving inexperience, a travel environment involving travel difficulty, or drowsiness. Further, the suitable learning and estimating can be performed not to do assistance of non-driving behavior on the basis of the estimation of the unsuitable non-driving behavior in a similar situation. For example, if learning is suppressed so that behavior in the case of driving inexperience or a travel environment involving travel difficulty, where the driver is compelled to extend their hand or where an action of opening the window with the fingers or the like, unlike during normal operation, is not learned, it is possible to prevent a state of affairs where the driver is no longer able to concentrate on driving when they should be concentrating on driving by automatically opening the window by estimating the action of opening the window in the event of a similar situation. The foregoing driving behavior and non-driving behavior are collectively called behavior. The driving behavior model and non-driving behavior model are collectively called behavior models. The assistance device executes at least one of causing a behavior model to learn for self-driving and estimating behavior on the basis of the behavior model.

While various embodiments have been described herein above, it is to be appreciated that various changes in form and detail may be made without departing from the spirit and scope of the invention(s) presently or hereafter claimed.

CROSS-REFERENCE TO RELATED APPLICATION

This application is based upon and claims the benefit of priority from the prior Japanese Patent Application No. 2017-167751, filed on Aug. 31, 2017, the entire contents of which are incorporated herein by reference.

What is claimed is:

1. An assistance system that executes a first processing including learning for a neural network of a first behavior model used for self-driving of a vehicle, the assistance system comprising:
 a processor; and
 a memory coupled to the processor, the memory storing a program that, when executed by the processor, causes the assistance system to:
  receive inputs of detected information including information related to driver operations, the neural network of the first behavior model configured to be adjusted based on the information related to driver operations;
  determine two or more information items affecting accuracy of the first behavior model, on the basis of the detected information, the two or more information items being selected from information items including a travel difficulty level of the vehicle, a wakefulness level of a driver, and a driving proficiency level of the driver;
  determine whether or not to execute the first processing including the learning for the neural network of the first behavior model based on levels of the two or more information items;
  execute the first processing including the learning for the neural network of the first behavior model in response to determining to execute the first processing, and not execute the first processing including the learning for the neural network of the first behavior model in response to determining to not execute the first processing; and
  output, to a reporting device on the vehicle, a determination result indicating whether or not the first processing including the learning for the neural network of the first behavior model is to be executed, and the levels of the two or more information items, the reporting device configured to concurrently display the determination result and the levels of the two or more information items.

2. The assistance system according to claim 1,
wherein the program, when executed by the processor, causes the assistance system to:
 determine the travel difficulty level of the vehicle, and
 make a determination to not execute the first processing including the learning for the neural network of the first behavior model if the travel difficulty level is above a threshold value.

3. The assistance system according to claim 1,
wherein the program, when executed by the processor, causes the assistance system to:
 determine the wakefulness level of the driver, and
 make a determination to not execute the first processing including the learning for the neural network of the first behavior model if the wakefulness level is below a threshold value.

4. The assistance system according to claim 1,
wherein the program, when executed by the processor, causes the assistance system to:
 determine the driving proficiency level of the driver, and
 make a determination to not execute the first processing including the learning for the neural network of the first behavior model if the driving proficiency level is below a threshold value.

5. The assistance system according to claim 1,
wherein the program, when executed by the processor, causes the assistance system to:
 determine, as the two or more information items affecting the accuracy of the first behavior model, three information items including the travel difficulty level of the vehicle, the wakefulness level of the driver, and the driving proficiency level of the driver, and
 determine whether or not to execute the first processing including the learning for the neural network of the first behavior model based on levels of a combination of the three information items.

6. The assistance system according to claim 1,
wherein the program, when executed by the processor, causes the assistance system to:
 determine the travel difficulty level of the vehicle and the wakefulness level of the driver, and
 in a case where the travel difficulty level is equal to or less than a first threshold value, make a determination to not execute the first processing including the learning for the neural network of the first behavior model if the wakefulness level is below a second threshold value or the wakefulness level is above a third threshold value that is greater than the second threshold value).

7. The assistance system according to claim 1,
wherein the program, when executed by the processor, causes the assistance system to:
 determine the travel difficulty level of the vehicle and the wakefulness level of the driver, and in a case where the travel difficulty level is above a first threshold value, make a determination to not execute the first processing including the learning for the neural network of the first behavior model if the wakefulness level is below a second threshold value.

8. The assistance system according to claim 1, wherein the program, when executed by the processor, causes the assistance system to:
determine the wakefulness level of the driver and the driving proficiency level of the driver,
set a threshold value lower as the driving proficiency level increases, and
make a determination to not execute the first processing including the learning for the neural network of the first behavior model if the wakefulness level is below the threshold value.

9. The assistance system according to claim 1, wherein the program, when executed by the processor, causes the assistance system to:
determine the travel difficulty level of the vehicle and the driving proficiency level of the driver,
set a threshold value higher as the driving proficiency level increases, and
make a determination to not execute the first processing including the learning for the neural network of the first behavior model if the travel difficulty level is above the threshold value.

10. The assistance system according to claim 1, wherein the assistance system executes a second processing relating to a second behavior model for an utterance, and
the program, when executed by the processor, causes the assistance system to:
receive detected information for the utterance, and
determine, as one or more information items affecting the accuracy of the second behavior model, at least one information item from among content of the utterance, a speaker of the utterance, and a processing position of the second behavior model.

11. The assistance system according to claim 10, wherein the program, when executed by the processor, causes the assistance system to:
determine the content of the utterance, and
make a determination to not execute the second processing if the content of the utterance is unplanned.

12. The assistance system according to claim 10, wherein the program, when executed by the processor, causes the assistance system to:
determine the speaker of the utterance, and
make a determination to not execute the second processing if the speaker of the utterance is unplanned.

13. The assistance system according to claim 10, wherein the program, when executed by the processor, causes the assistance system to:
determine the processing position of the second behavior model, and
make a determination to not execute the second processing if the processing position of the second behavior model is not spaced apart from an utterance position via a network.

14. The assistance system according to claim 1, wherein the assistance system executes a second processing relating to a second behavior model for a device, and
the program, when executed by the processor, causes the assistance system to:
receive detected information for the device, and
determine, as one or more information items affecting the accuracy of the second behavior model, at least one information item from among operation content of the device, human presence in a neighborhood of the device, and emotions of a person operating the device.

15. The assistance system according to claim 14, wherein the program, when executed by the processor, causes the assistance system to:
determine the operation content of the device, and
make a determination to not execute the second processing if the operation content of the device is unplanned.

16. The assistance system according to claim 14, wherein the program, when executed by the processor, causes the assistance system to:
determine the human presence in the neighborhood of the device, and
make a determination to not execute the second processing if the human presence in the neighborhood of the device indicates no human presence.

17. The assistance system according to claim 14, wherein the program, when executed by the processor, causes the assistance system to:
determine the emotions of the person operating the device, and
make a determination to not execute the second processing if the emotions of the person operating the device is dissatisfaction.

18. An assistance device that executes a first processing including learning for a neural network of a first behavior model used for self-driving of a vehicle, the assistance device comprising:
a processor; and
a memory coupled to the processor, the memory storing a program that, when executed by the processor, causes the assistance device to:
receive inputs of detected information from the vehicle, the detected information including information related to driver operations, the neural network of the first behavior model configured to be adjusted based on the information related to driver operations;
determine two or more information items affecting accuracy of the first behavior model on the basis of the detected information, the two or more information items being selected from information items including a travel difficulty level of the vehicle, a wakefulness level of a driver, and a driving proficiency level of the driver;
determine whether or not to execute the first processing including the learning for the neural network of the first behavior model based on levels of the two or more information items;
execute the first processing including the learning for the neural network of the first behavior model in response to determining to execute the first processing, and not execute the first processing including the learning for the neural network of the first behavior model in response to determining to not execute the first processing; and
output, to a reporting device on the vehicle, a determination result indicating whether or not the first processing including the learning for the neural network of the first behavior model is to be executed, and the levels of the two or more information items, the reporting device configured to concurrently display the determination result and the levels of the two or more information items.

19. An assistance method that executes a first processing including learning for a neural network of a first behavior model used for self-driving of a vehicle, the assistance method comprising:
receiving inputs of detected information including information related to driver operations, the neural network of the first behavior model configured to be adjusted based on the information related to driver operations;
determining, on the basis of the detected information thus input, two or more information items affecting accuracy of the first behavior model, the two or more information items being selected from information items including a travel difficulty level of the vehicle, a wakefulness level of a driver, and a driving proficiency level of the driver;
determining, on the basis of levels of the two or more information items, whether or not to execute the first processing including the learning for the neural network of the first behavior model;
executing the first processing including the learning for the neural network of the first behavior model in response to determining to execute the first processing, and not executing the first processing including the learning for the neural network of the first behavior model in response to determining to not execute the first processing; and
outputting, to a reporting device on the vehicle, a determination result indicating whether or not the first processing including the learning for the neural network of the first behavior model is to be executed, and the levels of the two or more information items, the reporting device displaying the determination result and the levels of the two or more information items.

20. The assistance system according to claim 1, wherein the first behavior model is configured to indicate an operating state of steering or braking of the vehicle.

21. The assistance system according to claim 20,
wherein the first behavior model is configured to indicate
an operating state of steering of the vehicle in a case where an angle of a steering wheel of the vehicle is adjusted so that a parameter value indicating a driving safety is higher than a first predetermined threshold, or
an operating state of braking of the vehicle in a case where a depression amount of a brake pedal of the vehicle is adjusted so that a parameter value indicating a driving safety is higher than a second predetermined threshold.

22. The assistance system according to claim 1,
wherein the first behavior model is configured indicate driving behavior and non-driving behavior.

23. The assistance system according to claim 22,
wherein the non-driving behavior includes (i) an adjustment operation of a parameter value for an air-conditioner of the vehicle, (ii) an adjustment operation of a parameter value for a speaker of the vehicle, or (iii) an operation of opening or closing a window of the vehicle.

24. The assistance device according to claim 18, wherein the first behavior model is configured to indicate an operating state of steering or braking of the vehicle.

25. The assistance device according to claim 24,
wherein the first behavior model is configured to indicate
an operating state of steering of the vehicle in a case where an angle of a steering wheel of the vehicle is adjusted so that a parameter value indicating a driving safety is higher than a first predetermined threshold, or
an operating state of braking of the vehicle in a case where a depression amount of a brake pedal of the vehicle is adjusted so that a parameter value indicating a driving safety is higher than a second predetermined threshold.

26. The assistance device according to claim 18,
wherein the first behavior model is configured indicate driving behavior and non-driving behavior.

27. The assistance device according to claim 26,
wherein the non-driving behavior includes (i) an adjustment operation of a parameter value for an air-conditioner of the vehicle, (ii) an adjustment operation of a parameter value for a speaker of the vehicle, or (iii) an operation of opening or closing a window of the vehicle.

28. The assistance method according to claim 19, wherein the first behavior model is configured to indicate an operating state of steering or braking of the vehicle.

29. The assistance method according to claim 28,
wherein the first behavior model is configured to indicate
an operating state of steering of the vehicle in a case where an angle of a steering wheel of the vehicle is adjusted so that a parameter value indicating a driving safety is higher than a first predetermined threshold, or
an operating state of braking of the vehicle in a case where a depression amount of a brake pedal of the vehicle is adjusted so that a parameter value indicating a driving safety is higher than a second predetermined threshold.

30. The assistance method according to claim 19,
wherein the first behavior model is configured indicate driving behavior and non-driving behavior.

31. The assistance method according to claim 30,
wherein the non-driving behavior includes (i) an adjustment operation of a parameter value for an air-conditioner of the vehicle, (ii) an adjustment operation of a parameter value for a speaker of the vehicle, or (iii) an operation of opening or closing a window of the vehicle.

* * * * *